(12) United States Patent
Kono et al.

(10) Patent No.: US 6,864,353 B2
(45) Date of Patent: Mar. 8, 2005

(54) PRODUCTION PROCESS FOR ETHYLENE OXIDE COPOLYMER

(75) Inventors: Michiyuki Kono, Neyagawa (JP); Manabu Kikuta, Kyotanabe (JP); Masahito Nishiura, Nishinomiya (JP); Fumihide Tamura, Kusatsu (JP); Taketo Toba, Takarazuka (JP); Shigetaka Takamiya, Himeji (JP); Koichiro Saeki, Suita (JP); Kazuo Takei, Suita (JP); Toshiaki Kuriyama, Yokohama (JP); Masashi Yukitake, Kawasaki (JP)

(73) Assignees: Dai-ichi Kogyo Seiyaku Co., Ltd., Kyoto (JP); Nippon Shokubai Co., Ltd., Osaka (JP)

( * ) Notice: Subject to any disclaimer, the term of this patent is extended or adjusted under 35 U.S.C. 154(b) by 80 days.

(21) Appl. No.: 10/336,421

(22) Filed: Jan. 3, 2003

(65) Prior Publication Data
US 2003/0158374 A1 Aug. 21, 2003

(30) Foreign Application Priority Data
Jan. 15, 2002 (JP) ........................................ 2002-006725

(51) Int. Cl.$^7$ ............................................... C08G 65/34
(52) U.S. Cl. ...................... 528/425; 528/403; 528/421; 528/502 R; 528/503
(58) Field of Search ............................... 528/425, 403, 528/421, 502 R, 503

(56) References Cited

U.S. PATENT DOCUMENTS 3,029,216 A 4/1962 Bailey et al.
4,195,167 A 3/1980 Knopf et al.
4,223,164 A 9/1980 Yang et al.
4,946,984 A 8/1990 Hauser
5,686,379 A 11/1997 Imanaka et al.
5,750,796 A 5/1998 Hama et al.

FOREIGN PATENT DOCUMENTS

| | | |
|---|---|---|
| EP | 0 026 544 A1 | 4/1981 |
| EP | 0 339 426 A2 | 11/1989 |
| EP | 0 826 715 A1 | 3/1998 |
| EP | 1 130 044 A1 | 9/2001 |
| EP | 1 258 502 A2 | 11/2002 |
| JP | 59-33021 B2 | 8/1984 |
| JP | 63-32055 B2 | 6/1988 |
| JP | 2-71841 A | 3/1990 |
| JP | 2-134336 A | 5/1990 |
| JP | 5-339361 A | 12/1993 |
| JP | 6-15038 B2 | 3/1994 |
| JP | 6-505986 A | 7/1994 |
| JP | 7-70308 A | 3/1995 |
| JP | 7-227540 A | 8/1995 |
| JP | 8-268919 A | 10/1996 |
| WO | WO 90/07980 A1 | 7/1990 |
| WO | WO 92/17431 A1 | 10/1992 |

*Primary Examiner*—Duc Truong

(57) ABSTRACT

The present invention provides a production process, in which, when an ethylene oxide copolymer is obtained, conditions for obtaining this copolymer having a desirable molecular weight with ease and good reproducibility are provided. The production process for an ethylene oxide copolymer, according to the present invention, comprises the step of carrying out polymerization of a monomer mixture under stirring in a solvent, thereby obtaining the ethylene oxide copolymer, wherein the monomer mixture includes ethylene oxide and a substituted oxirane compound of a structural formula (1) as essential raw materials; with the production process being characterized in that the stirring is carried out by a stirring power of not less than 0.6 kW/m$^3$.

15 Claims, 2 Drawing Sheets

PRODUCTION PROCESS FOR ETHYLENE OXIDE COPOLYMER

BACKGROUND OF THE INVENTION

A. Technical Field

The present invention relates to a production process for an ethylene oxide copolymer. More particularly, the present invention relates to a production process for an ethylene oxide copolymer as obtained by carrying out ring-opening polymerization of monomers including a substituted oxirane compound.

B. Background Art

Ethylene oxide and a group of substituted oxirane compounds have hitherto been used as raw monomers of various polymer materials in view of their rich reactivity and high industrial usability. Then, ethylene oxide copolymers as obtained by carrying out polymerization of the above raw monomers are used as polymer materials in very wide-ranging uses, such as: polyurethane resins (e.g. adhesives, paints, sealing agents, elastomers, and floor-polishing agents); and besides hard, soft, or half-hard polyurethane resins; and surfactants, sanitary products, deinking agents, lubricating oils, engine-starting oils, and polyelectrolytes.

Usually, polymer materials have different molecular weights that are desired each in various uses. Therefore, in order to display such as their excellent properties, it is important how the polymer materials having molecular weights corresponding to the various uses can be prepared in a state of little scatter. Accordingly, also when the ethylene oxide copolymers are used, it is necessary to control the molecular weights of the above copolymers depending upon each use, and such as production processes and preparation techniques for the above copolymers are very important.

However, the substituted oxirane compounds as the raw monomers of the ethylene oxide copolymers easily accompany a chain transfer reaction during the polymerization. As a result, there is a problem such that the lowering of the molecular weights of the above copolymers is easily caused, and therefore it has been very difficult to obtain ethylene oxide copolymers having desirable molecular weights with good reproducibility.

SUMMARY OF THE INVENTION

A. Object of the Invention

Accordingly, an object of the present invention is to provide a production process, in which, when the above ethylene oxide copolymer is obtained, conditions for obtaining this copolymer having a desirable molecular weight with ease and good reproducibility are provided.

B. Disclosure of the Invention

The present inventors have diligently studied in order to solve the above-mentioned problems.

In the course, the present inventors have thought that: in order to obtain an ethylene oxide copolymer having a desirable weight-average molecular weight with good reproducibility, it is important to control various conditions when its raw monomers are subjected to polymerization reaction, and they have continued various experiments and studies.

As to various conditions during the polymerization, there are various parameters that should be set up, such as capacity of a polymerization vessel, total amount as charged, rotation number of stirring blades, stirring power, conditions of supplying monomers (supplying rate of monomers), reaction temperature, and pressure. Then, the present inventors have found out that: when the ethylene oxide copolymer having a desirable molecular weight is obtained with good reproducibility, such as the stirring power for contents of a reaction vessel during the polymerization (necessary stirring power per unit volume), the reaction temperature during the polymerization, and the water content of the raw substances are greatly concerned. Of the above, the viscosity of the contents (products, reaction mixture) is greatly increased accompanying the proceeding of the polymerization reaction, and therefore the value of the above stirring power is particularly lowering in comparison with the value at the beginning of the reaction according as the reaction proceeds. Hitherto, as a result, the value of this stirring power has been frequently in a lowered state unnecessarily at the end of the reaction, and it has been understood that it causes various problems.

That is to say, they have found out that the lowering of the molecular weight is easily caused. The reasons are, for example, because: when a stirring power having not less than a definite value is not ensured as to the above stirring power during the polymerization reaction (particularly, during the latter part of the reaction with high viscosity), the flowability is lowered in the reaction vessel (Raynolds number is decreased.), and the heat conductivity is lowered, and therefore the temperature range itself that is necessary in view of safety and product properties is difficult to control; and besides because: (1) the concentration of the substituted oxirane compound is increased in a reaction solution because the ethylene oxide is difficult to absorb in the reaction solution, and the chain transfer reaction is easily caused.; (2) the mixing state in a reaction solution is deteriorated, and a portion where heat is accumulated is caused, and therefore the chain transfer reaction is easily caused at the portion.; and (3) the mixing state in a reaction solution is deteriorated, and the distribution of the monomers is non-uniform, and therefore the chain transfer reaction is easily caused at a portion where the concentration of the substituted oxirane compound is high.

Usually, the above stirring power is made much of as a parameter for controlling such as particle diameters of polymers in such as heterogeneous polymerization reactions (such as emulsion polymerization). Hitherto generally, the stirring power has not been adjusted strictly for the purpose of controlling something in a homogeneous polymerization reaction, and naturally, the stirring power has not especially been taken note of in view of controlling the molecular weight of the copolymer.

In addition, as counter-methods under circumstances where the stirring power is small, such as a method that involves also lowering the viscosity of the reaction system and increasing the heat conductivity by carrying out the polymerization in such a manner that the concentration of the resultant polymer will be lowered at the end of the reaction, and a method that involves lowering the supplying rate of the raw monomers, have been considered. However, in the former method, the production amount per batch is decreased, and further the increase of costs is also caused due to the increase of the amount of the solvent as used. In the latter method, the reaction time is prolonged, and the production efficiency is lowered, and therefore the problems have not been solved.

Accordingly, the present inventors have found out that: as to the above production process for an ethylene oxide copolymer, the above problems can be solved at a stroke if the polymerization reaction is allowed to proceed under stirring in such a manner that the value of the above stirring power is adjusted in a specific range on the basis of the value of the stirring power at the end of the reaction. Then, they have confirmed this finding and completed the present invention.

That is to say, a production process for an ethylene oxide copolymer, according to the present invention, comprises the step of carrying out polymerization of a monomer mixture under stirring in a solvent, thereby obtaining the ethylene oxide copolymer, wherein the monomer mixture includes ethylene oxide and a substituted oxirane compound of a structural formula (1) below as essential raw materials; with the production process being characterized in that the stirring is carried out by a stirring power of not less than 0.6 kW/m$^3$, wherein the structural formula (1) is:

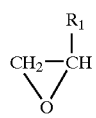
(1)

where: $R_1$ denotes Ra (Ra is any group having 1 to 16 carbon atoms selected from among alkyl groups, cycloalkyl groups, aryl groups, aralkyl groups, (meth)acryloyl groups, and alkenyl groups) or a —$CH_2$—O—Re—Ra group (Re has a structure of —($CH_2$—$CH_2$—O)$_p$— (p denotes an integer of 0 to 10))).

In addition, in the present invention production process for an ethylene oxide copolymer above, it can be arranged that:

the polymerization should be carried out at a reaction temperature of lower than 120° C.;

the polymerization of the monomer mixture should be carried out using a reaction initiator, and the solvent should have a water content of not more than 1 in mol ratio relative to the amount of the reaction initiator when the polymerization is initiated;

the substituted oxirane compound should include, as an essential component, a substituted oxirane compound having a crosslinkable substituent;

the polymerization should be carried out while at least a portion of the monomer mixture is supplied into the solvent, and as to at least one of the essential raw materials, its supplying rate should be varied; and the polymerization should be carried out while at least a portion of the monomer mixture is supplied into the solvent, and there should exist a period in which at least one of the essential raw materials is not supplied.

These and other objects and the advantages of the present invention will be more fully apparent from the following detailed disclosure.

DETAILED DESCRIPTION OF THE INVENTION

Figure 1:
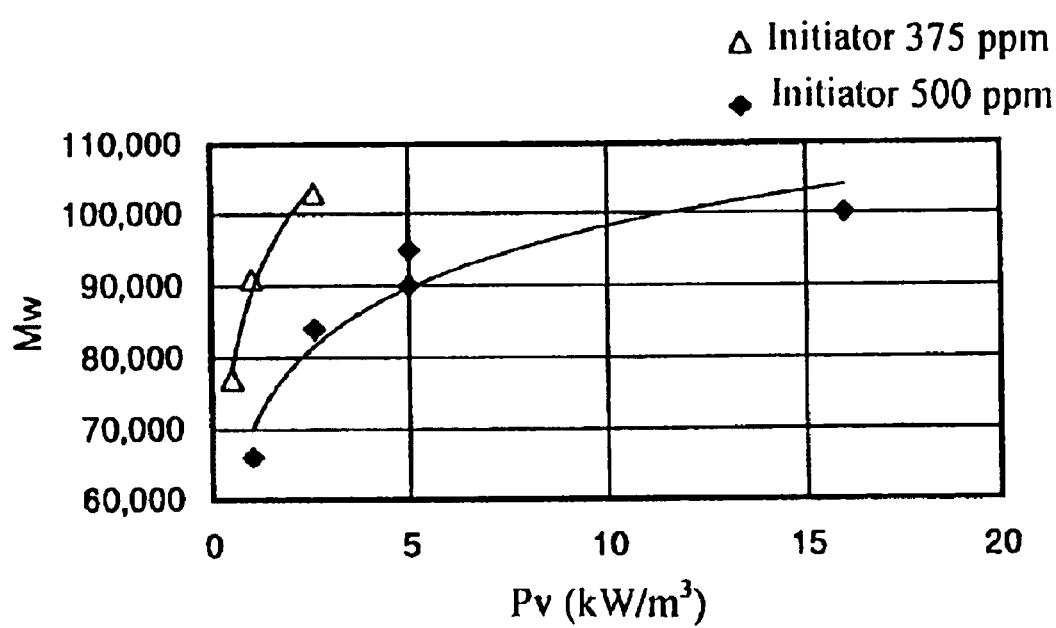
FIG. 1 is a graph concerning the stirring power Pv during the polymerization and the weight-average molecular weight Mw of the polymer as obtained.

Hereinafter, the present invention production process for an ethylene oxide copolymer (hereinafter, referred to as the present invention production process) is explained in detail. However, the scope of the present invention is not limited to these explanations. Anything other than the following illustrations can also be fitly changed and carried out in such a range as not to hinder the purpose of the present invention.

In the present invention production process, it is arranged that: a monomer mixture including ethylene oxide and a substituted oxirane compound of a structural formula (1) below as raw monomers and as essential raw materials should be subjected to polymerization in order to obtain the ethylene oxide copolymer.

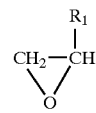
(1)

where: $R_1$ denotes Ra (Ra is any group having 1 to 16 carbon atoms selected from among alkyl groups, cycloalkyl groups, aryl groups, aralkyl groups, (meth)acryloyl groups, and alkenyl groups) or a —$CH_2$—O—Re—Ra group (Re has a structure of —($CH_2$—$CH_2$—O)$_p$— (p denotes an integer of 0 to 10))).

The $R_1$ group in the above structural formula (1) is a substitutent in the above substituted oxirane compound.

The substituted oxirane compound as used as the raw monomer may be only one of substituted oxirane compounds that can be represented by the above structural formula (1), or may include at least two of such substituted oxirane compounds.

Specific examples of the substituted oxirane compound of the above structural formula (1) include propylene oxide, butylene oxide, 1,2-epoxypentane, 1,2-epoxyhexane, 1,2-epoxyoctane, cyclohexene oxide, and styrene oxide, or methyl glycidyl ether, ethyl glycidyl ether, and ethylene glycol methyl glycidyl ether. Particularly, when the $R_1$ group is a crosslinkable substituent, examples thereof include epoxybutene, 3,4-epoxy-1-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, and glycidyl-4-hexanoate, or vinyl glycidyl ether, ally glycidyl ether, 4-vinylcyclohexyl glycidyl ether, α-terpenyl glycidyl ether, cyclohexenyl methylglycidyl ether, 4-vinylbenzyl glycidyl ether, 4-allylbenzyl glycidyl ether, allyl glycidyl ether, ethylene glycol allyl glycidyl ether, ethylene glycol vinyl glycidyl ether, diethylene glycol allyl glycidyl ether, diethylene glycol vinyl glycidyl ether, triethylene glycol allyl glycidyl ether, triethylene glycol vinyl glycidyl ether, oligoethylene glycol allyl glycidyl ether, and oligoethylene glycol vinyl glycidyl ether. As is mentioned above, these may be used either alone respectively or in combinations with each other.

The monomer mixture as mentioned in the present invention may include not only the above ethylene oxide and the above substituted oxirane compound as the raw monomers but also may include other monomers.

When the ethylene oxide copolymer is obtained in the present invention production process, it is arranged that the monomer mixture should be polymerized under stirring in a solvent. There is no especial limitation on the method of such the polymerization, but favorable examples thereof include a solution polymerization method and a precipitation polymerization method. Of the above, the solution polymerization method is more favorable because of its excellent productivity. The solution polymerization method that involves carrying out the polymerization while raw monomers are supplied into a solvent as charged beforehand is particularly favorable because of its safety such that the reaction heat is easily cooled.

As the above solvent, favorable are organic solvents containing no active hydrogen such as a hydroxyl group. Examples thereof include: aromatic hydrocarbon solvents, such as benzene, toluene, xylene, and ethylbenzene; aliphatic hydrocarbon solvents, such as heptane, octane, n-hexane, n-pentane, and 2,2,4-trimethylpentane; alicyclic hydrocarbon solvents, such as cyclohexane and methylcyclohexane; ether solvents, such as diethyl ether, dibutyl ether, and methyl butyl ether; solvents of ethylene glycol dialkyl ethers such as dimethoxyethane; cyclic ethers, such as THF (tetrahydrofuran) and dioxane. The toluene and xylene are more favorable.

It is favorable that the solvent as mentioned in the present invention is further the above organic solvent and does not contain water at all. However, there are many cases where the above organic solvent usually and generally contains a small amount of water unless the perfect dehydration treatment is carried out. As is mentioned below in the present invention production process, it is important and favorable that the water content in the above organic solvent is controlled in not more than a definite amount.

Although not especially limited in the present invention production process, such as hitherto used reaction initiators (polymerization initiators), antioxidants, and solvating agents may further be added to use them during the above polymerization.

There is no especial limitation on the above reaction initiators, but specific examples thereof favorably include: alkaline catalysts, such as sodium hydroxide, potassium hydroxide, potassium alcoholate, sodium alcoholate, potassium carbonate, and sodium carbonate; metals, such as potassium metal and sodium metal; Al—Mg composite oxide catalysts, such as calcined products of aluminum hydroxide magnesium (e.g. JP-A-268919/1996), magnesium oxides as obtained by adding metal ions (e.g. JP-B-015038/1994 and JP-A-227540/1995), calcined hydrotalcites (e.g. JP-A-718441/1990), or their surface-modified catalysts (e.g. JP-A-334782/1994); and barium oxides and barium hydroxides (e.g. JP-A-075187/1979), layer compounds (e.g. JP-A-505986/1994), strontium oxides and strontium hydroxides (e.g. JP-B-032055/1988), calcium compounds (e.g. JP-A-134336/1990), cesium compounds (e.g. JP-A-070308/1995), cyanated complexes of composite metals (e.g. JP-A-339361/1993), and acid catalysts, such as Lewis acids and Friedel-Crafts catalysts. The above reaction initiators may be used either alone respectively or in combinations with each other.

The reaction initiator can adjust the molecular weight of the resultant polymer by adjusting its amount as used. The above amount as used may fitly be judged in order to obtain a polymer having a desirable molecular weight, and it is not especially limited. For example, the amount as used may be set on the basis of the amount of the monomer mixture as charged. Specifically, the amount can be set in such a manner that not less than 1 $\mu$mol of the reaction initiator is used per 1 g of the amount of the monomer mixture as charged, but it is not especially limited. When a polymer having a high molecular weight is generally obtained, it is necessary to decrease the amount of the reaction initiator as used. However, when the amount as used is too small, there are cases where: the productivity is damaged because the reaction proceeds extremely slowly, or the polymerization reaction does not proceed because the reaction is extremely susceptible to the contamination with polymerization retardants such as water in the reaction system. In addition, in order to obtain the polymer having a high molecular weight, for example, it is important that: the above amount of the reaction initiator as used is adjusted, and further the polymerization retardants (e.g. water) and impurities are removed from the reaction system, and the reaction system is adjusted in order not to cause the above-mentioned chain transfer reaction.

As to the addition method of the reaction initiator, the entire amount as used may be beforehand charged together with the solvent before the beginning of supplying the monomer mixture into the solvent, or the reaction initiator may be added in a lump or gradually (continuously added and/or intermittently added) after the beginning of supplying the monomer mixture, and it is not especially limited.

When the monomer mixture is polymerized by using the above reaction initiator in the present invention production process, it is favorable to adjust the water content in the above solvent in the reaction system. Particularly, when the monomer mixture is polymerized by using the reaction initiator, the water content in the above solvent at the beginning of the polymerization reaction is favorably adjusted to not more than 1, more favorably not more than 0.5, still more favorably not more than 0.3, most favorably 0, in mol ratio relative to the amount of the reaction initiator in the above solvent. In the case where the above mol ratio exceeds 1, there is a possibility that: the molecular weight of the polymer as obtained is lowered, and further the polymerization reaction does not proceed. Particularly, when the toluene is used as the solvent, the influence of the above water content is very large.

As is mentioned above, there is no especial limitation on the method for adjusting and controlling the water content in the solvent, but specific favorable examples thereof include: a physical method which involves dehydration by such as molecular-sieve treatment and purification by distillation; and a method by a chemical reaction, which involves removing water by using compounds having high reactivity for water, such as sodium metal and alkyl aluminum compounds. Of the above, the former physical method is more favorable, and the molecular-sieve treatment and purification by distillation are still more favorable, in consideration of industrial practicability.

There is no especial limitation on the kinds of polymerization reactions and polymerization mechanisms in each the aforementioned polymerization method (such as solution polymerization method), but favorable examples thereof include anionic polymerization, cationic polymerization, coordination polymerization, and immortal polymerization. Of the above, the anionic polymerization is more favorable because: materials having high purity can be obtained industrially easily, and therefore the polymer can be obtained with good reproducibility, and besides, the reaction initiator is easy to handle, and the adjustment of the molecular weight is comparatively easy.

In the present invention production process, the reaction vessel as used during the polymerization may be usually a reaction vessel that can be used when a polymer is obtained by polymerization reaction, and it may be favorable if it is excellent in such as heat resistance, chemical resistance, corrosion resistance, cooling ability and pressure resistance, but there is no especial limitation on its kind.

The reaction vessel may be a reaction vessel in which the contents such as a charged solvent and a supplied monomer mixture can be stirred, and it is favorably such a reaction vessel that is equipped with stirring blades and can arbitrarily stir the contents under desirable conditions. There is no especial limitation on the above stirring blades, but specific favorable examples thereof include stirring tanks equipping with anchor impellers, stirring tanks equipping with helical-ribbon impellers, stirring tanks equipping with double-helical-ribbon impellers, stirring tanks equipping with helical-screw impellers with draft tubes, concentric coaxial mixing vessels (e.g. product name: SUPERBLEND, made by Sumitomo Heavy Industries. Ltd.) equipped with SUPER BLEND impellers (inner impeller: MAX BLEND impeller, and outer impeller: mavable helical baffle), stirring tanks equipping with MAX BLEND impellers (made by Sumitomo Heavy Industries. Ltd.), stirring tanks equipping with FULLZONE impellers (made by Shinko Pantec Co., Ltd.), stirring tanks equipping with SUPERMIX impellers (made by Satake Chemical Equipment Mfg. Ltd.), stirring tanks equipping with a Hi-F mixer (made by Soken Chemical & Engineering Co.,Ltd.), stirring tanks equipping with SANMELER impellers (made by Mitsubishi Heavy Industries, Ltd.), stirring tanks equipping with LOGBORN (made by Shinko Pantec Co., Ltd.), stirring tanks equipping with VCR (made by Mitsubishi Heavy Industries, Ltd.), and stirring tanks equipping with such as twisted-lattice blades (made by Hitachi, Ltd.), turbine impellers, paddle blades, Pfaudler blades, BRUMARGIN blades, and propeller blades.

The reaction vessel favorably has an outfit to enable heating and maintenance in order that the contents are adjusted to not higher than a desirable reaction temperature. Specific examples of the outfit to enable heating and maintenance include jackets, coils, and outer-circulation-type heat exchangers, but there is no especial limitation thereto.

In addition to the above-mentioned outfit for such as the stirring and heating, the reaction vessel can also be arbitrarily equipped with any of various outfits, such as: detector ends of such as a baffle, a thermometer, and a pressure gage; supplying apparatuses that uniformly disperse raw materials into a liquid or a gas phase; and apparatuses for washing the inside of reaction vessels and reaction tanks, because of such as carrying out the polymerization reaction efficiently.

In the present invention production process, the reaction vessel is favorably used in the following way: before the monomer mixture is polymerized, the reaction vessel is washed with the above solvent and then heat-dried, and thereafter, the inside of reaction vessel is replaced with an inert gas, or the inside of reaction vessel is placed in a vacuum state. As to the inert gas, such as a nitrogen gas, a helium gas, and an argon gas are favorable. The above solvent and inert gas favorably have high purity. For example, in the case of being contaminated with water, there is a possibility that the inhibition (disturbance) of the polymerization and the lowering of the molecular weight are caused. In the case of being contaminated with oxygen, there is a possibility that the danger of exploding the ethylene oxide is enlarged.

In the present invention production process, after such as the above washing, the reaction vessel is favorably beforehand charged with the solvent before the monomer mixture is polymerized.

The amount of such as the solvent as charged may fitly be adjusted in consideration of such as properties and production amount of the desirable copolymer, but there is no especial limitation on the amount.

After such as the solvent is charged, it is favorable to again replace the inside of the reaction vessel with the inert gas, or to place the inside of reaction vessel in a state of reduced pressure, favorably in a vacuum state. When the polymerization is carried out under an atmosphere as replaced with the inert gas, it is favorable to adjust the gas-phase portion in the reaction vessel in order that the ratio of the inert gas is not less than a definite value. Then, the internal pressure of the reaction vessel (initial pressure) is favorably adjusted by the inert gas at the same time. There is no especial limitation on the internal pressure of the reaction vessel (initial pressure). In consideration of the amount of the ethylene oxide that exists in the reaction vessel, the internal pressure may fitly be adjusted in such an extent that the safety is controlled.

In the present invention production process, the polymerization is carried out under stirring the solvent together with the monomer mixture.

As to the above stirring, before the monomer mixture is supplied into the solvent, the contents such as the solvent in the reaction vessel are favorably stirred by such as rotating the stirring blades which the reaction vessel is equipped with. However, the stirring may be started during the supply, or at the beginning of the supply, or after the beginning of the polymerization, and there is no especial limitation on the timing of the beginning of the stirring. In addition, the stirring is favorably continued until the polymerization reaction is completed.

In the present invention production process, it is important that the above stirring is carried out by controlling such as the rotation number of the stirring blade in order that the stirring power is adjusted to not less than 0.6 kW/m$^3$, favorably not less than 1 kW/m$^3$, more favorably not less than 2 kW/m$^3$. This stirring power is favorably controlled until the polymerization is completed (also including during the supply of the monomer mixture).

Herein, the stirring power generally means a value that is calculated as the necessary stirring power regarded as hitherto known technical common knowledge, namely the necessary power per a unit liquid amount of the contents in the reaction vessel, more particularly, the necessary power per a unit liquid amount of the contents, which is calculated from such as the volume and viscosity of the contents, the shape of the reaction vessel, the shape of the stirring blades, and the rotation number. However, in the present invention production process, the above stirring power is specified in order to satisfy the above range for the product (hereinafter, also referred to as "reaction mixture") at the end of the polymerization reaction. Therefore, it is not always necessary that the stirring power satisfying the above range should be ensured in the entire reaction system from the beginning to the end of the polymerization reaction.

In the present invention production process, there is no especial limitation in order that the stirring power will satisfy the above range at the end of the polymerization reaction. For example, the stirring rotation number that is necessary at the end of the polymerization reaction may be calculated from such as the viscosity and the capacity of the product at the end of the polymerization reaction and the shape of the stirring blades, and the reaction may be carried out while the stirring rotation number is kept constant from the beginning to the end of the polymerization reaction. Herein, there is no especial limitation on the viscosity of the product at the end of the polymerization reaction, but the viscosity is fitly set in the range of such as 200 to 2,000,000 cps in consideration of the kind and the amount of the monomer as used, and besides, the above stirring rotation number can be calculated.

In the case where the above stirring power is less than 0.6 kW/m$^3$, the flowing state in the reaction vessel is deteriorated because the contents are not stirred uniformly, and the productivity of the polymer is lacking, and further the local heat accumulation is also easily caused, and the temperature distribution of the reaction liquid, and the concentration distribution of such as the monomers are also non-uniform, and therefore there is a possibility that abnormal reactions (reckless reactions) are caused.

In the present invention production process, the reaction temperature during the polymerization reaction is favorably fitly adjusted and controlled, and it is more favorably adjusted and controlled beforehand before the monomer mixture is supplied into the solvent and the polymerization is initiated, in the same way as of the adjustment of the internal pressure in the reaction vessel. More particularly, what is called the internal temperature is favorably controlled so that such as the solvent as charged in the reaction vessel has a desirable reaction temperature beforehand. The control of this reaction temperature is favorably applied until the polymerization is completed (also including during the supply of the monomer mixture).

The above reaction temperature is favorably lower than 120° C., more favorably not higher than 110° C., still more favorably not higher than 100° C. In addition, even if the above reaction temperature is always controlled, a few errors can be caused inevitably because of the influence of such as the kind of the outfit for the adjustment of the temperature and the change of the temperature during the supply of the monomers. However, if the error is in the range of lower or higher than the above favorable temperature range by 5° C., the excellent effect can be obtained in the same way as of that in the case where there is no error. However, the temperature range that can be thought by including the error range is lower than 120° C.

In the case where the above reaction temperature is beyond the above temperature range, various troubles are caused with the molecular weight of the ethylene oxide copolymer as obtained. More particularly, in the case where the above reaction temperature is not lower than 120° C., the frequency of the chain transfer reaction is increased, the lowering of the molecular weight is easily caused. In a striking case, there is a case where the lowering of the molecular weight is caused in such an extent that the molecular weight cannot be controlled by adjusting the amount of the reaction initiator as added.

The control of the above temperature is favorably carried out uniformly until the polymerization reaction is completed, but the reaction temperature can also be arbitrarily changed in the above temperature range in the reaction operation, depending on circumstances or when the occasion demands. There is no especial limitation on examples in which the control of this temperature is changed, but a specific example thereof is such that: when the monomer mixture is successively supplied to carry out the polymerization, the temperature is controlled by setting once at a stage of the beginning of the supply, but thereafter the internal temperature of the reaction system is raised by heat as caused due to the beginning of the polymerization reaction, and therefore the temperature is controlled while the temperature after the rise is regarded as a set temperature. Herein, that the reaction temperature is kept constant means that the control may be carried out in the range of lower or higher than a desirable reaction temperature by 5° C.

As to the adjustment of the above reaction temperature, the temperature of the contents as charged may be adjusted and controlled by such as heating the reaction vessel or directly heating the contents, but there is no especial limitation thereto. Examples of outfits to enable the adjustment of the reaction temperature include widely used jackets, coils, and outer-circulation-type heat exchangers, but there is no especial limitation thereto.

As is mentioned above in the present invention production process, it is favorable that: the reaction vessel is charged with such as the solvent, and further such as the above stirring power and reaction temperature are adjusted and controlled in specific ranges, and besides the monomer mixture is supplied into the solvent, and then the polymerization is carried out under stirring.

There is no especial limitation on the amount of the monomer mixture as used and mentioned in the present invention, but specifically the concentration of the ethylene oxide copolymer (polymer concentration) in the product at the end of the polymerization reaction may be larger than 20 weight % or larger than 30 weight %. In the case where the above polymer concentration as to the amount of the above monomer mixture as used is not larger than 20 weight %, there is a case where the productivity is lowered and the practicability is lacking.

There is no especial limitation on each the amount of the ethylene oxide or the substituted oxirane compound as used in the monomer mixture. The amount may fitly be set in such an extent that: the viscosity of the ethylene oxide copolymer as obtained is not lowered too much, and its practicability is not lacking. In addition, when the substituted oxirane compound having the crosslinkable substituent is used, it may be used in an arbitrary ratio relative to the entire substituted oxirane compound, and there is no especial limitation.

When it is arranged that the monomer mixture should include monomers other than the above monomers, the amount as used may be set in the same way in consideration of the ethylene oxide copolymer as obtained.

In the present invention production process, the monomer mixture is polymerized under stirring in the solvent. However, as to the supply of the monomer mixture into the solvent, the polymerization may be carried out by supplying the entire monomer mixture on lump addition, or the polymerization may be carried out by dividing the entire monomer mixture and supplying each on lump addition, or the polymerization may be carried out while at least a portion of the monomer mixture is supplied, but there is no especial limitation thereto.

The above-mentioned case where the polymerization is carried out while at least a portion of the monomer mixture is supplied can be regarded that the polymerization is carried out while at least a portion of the monomer mixture is supplied on successive addition.

In addition, the operation of supplying at least a portion of the monomer mixture means, for example, that: a portion of the amount of the entire monomer mixture as charged is beforehand supplied into the solvent as an initial amount as supplied (initial amount as charged) and then the polymerization may be carried out while the resultant residual portion is supplied, or the polymerization may be carried out while the entire monomer mixture is supplied.

The above successive addition means supplying continuously and/or intermittently (hereinafter, referred to as "continuous supply" and "intermittent supply"). The "continuous supply" means successive addition of being continuously supplied little by little, and the "intermittent supply" means successive addition of being intermittently supplied by dividing the amount as charged for arbitrary times, such as being supplied in a few divided times. When the continuous supply is carried out, it is more favorable that: the supply is carried out at a desirable reaction temperature, and the temperature is easily controlled uniformly. As to the control of this reaction temperature, the supplying rate is favorably adjusted in accordance with such as the kinds of the raw materials of the copolymer. More particularly, the above supplying rate is favorably adjusted in consideration of such as the reaction rate of the monomer mixture as used and the cooling ability or permissible pressure of the reaction vessel as used. Incidentally, the continuous and/or intermittent supply also includes a supplying method as obtained by a combination of the continuous supply and the intermittent supply, such that: the intermittent supply is carried out on the whole, but the continuous supply is carried out in each the intermittent supply.

As is mentioned above in the present invention production process, when it is arranged that the polymerization should be carried out while at least a portion of the monomer mixture is supplied into the solvent, the polymerization may proceed until the end of the supply while the supplying rate is kept constant. However, as to at least one of the essential raw materials (ethylene oxide and substituted oxirane compound) in the monomer mixture, its supplying rate is varied, and thereby the height of the melting point of the resultant polymer can be adjusted in a possible range. The variation of the supplying rate may be variation of such as being changed into an arbitrary different rate at least one time. In this case, the change of the rate may be carried out in a moment (continuously), or it may be carried out not in a moment but continuously while the rate itself is varied until the rate after the change is reached, or it may be carried out by inserting a time in which the supply is not carried out temporarily. There is no especial limitation thereto. Similarly, the variation of the supplying rate may be variation of such as continuously varying the rate itself arbitrarily. In this case, the rate variation of the rate itself may be constant or not, and there is no especial limitation thereto. In addition, the variation of the supplying rate may be in a combination of these various variation forms. As to respective various monomers to be the above essential raw materials, the above variation of the supplying rate is considered from the beginning to the end of the supply. In the present invention, the ethylene oxide is difficult to absorb in a liquid phase of the reaction system in a state of high viscosity in the latter part of the reaction, and therefore it is effective to make the supplying rate slow in the latter part of the reaction.

Furthermore, as is mentioned above in the present invention production process, when it is arranged that the polymerization should be carried out while at least a portion of the monomer mixture is supplied into the solvent, there should exist a period in which at least one of the essential raw materials (ethylene oxide and substituted oxirane compound) is not supplied, and thereby the height of the melting point of the resultant polymer can be adjusted in a possible range. There should exist the above period from the beginning of supplying at least one monomer in the monomer mixture to the end of supplying all the monomers in the monomer mixture.

In the present invention production process, after the end of the supply of the monomer mixture, the resultant product in the reaction vessel is favorably aged when the occasion demands. There is no especial limitation on the condition (e.g. temperature and time) when the aging is carried out, but it may fitly be set.

There is a case where the solvent and unreacted raw monomers exist in a gas phase when the pressure in the reaction vessel is released after the above supply or aging. Therefore, when the occasion demands, they are favorably subjected to complete combustion with combustion apparatuses for discharged gases (e.g. combustion furnace and combustion catalysts). In addition, steam can be obtained by recovering heat as then generated.

In the present invention production process, when the occasion demands, a solvent is further added to the ethylene oxide copolymer as obtained after the above supply or aging, and thereby the above copolymer may be dissolved in order to have a desirable viscosity. There is no especial limitation on the solvent as then used, but the solvents as used during the polymerization are favorable. In addition, when the occasion demands, various stabilizers (e.g. antioxidants), and solvating agents may also be added together with this solvent. Such as various stabilizers and solvating agents may be added after blending with the aforementioned solvent or separately. There is no especial limitation thereto.

The present invention production process may further comprise some or other steps in addition to various steps as mentioned above, such as: the polymerization step of carrying out the polymerization of the monomer mixture while the monomer mixture is supplied into the solvent and stirred; and the aging step of carrying out the aging of the product as obtained in the polymerization step, and there is no especial limitation thereto. The production process may further comprise, for example, a step (what is called, devolatilization step) of recovering the ethylene oxide copolymer by volatizing the solvent component under heated conditions from the products as obtained, subsequently to the above polymerization step, and the aging step as carried out when the occasion demands.

The reason why it is favorable to comprise the devolatilization step is explained below.

As to the purification and recovery of the polymer after the polymerization reaction in the production process for an ethylene oxide copolymer, have hitherto been adopted methods such as: (1) a method that involves precipitating the polymer by pouring the polymerization reaction solution into a poor solvent after the solution polymerization, and carrying out filtration or centrifugation treatment, and thereafter subjecting the resultant polymer to drying and pulverization; and (2) a method that involves carrying out filtration or centrifugation treatment of the reaction mixture after the precipitation polymerization, and subjecting the resultant recovered polymer to drying and pulverization. However, it is arranged that such as these methods (1) and (2) should be carried out through the step of heat-drying and pulverizing the polymer because the methods also have an object of such as obtaining a polymer having high purity. Therefore, there has been danger of explosion as caused by the electrification and heating of the polymer, wherein the electrification is due to such as electrostatic charge as generated then. Accordingly, in consideration of its prevention and safety, it has been generally essential to add a sufficient quantity of antistatic agent.

However, the addition of this antistatic agent causes such as the rise of the permittivity of the polymer as obtained unnecessarily, the cause of lowering crosslinking degree and increasing moisture absorbency, and then the increase of the swelling capacity of the copolymer unnecessarily, and the lowering of the strength. Accordingly, the ethylene oxide copolymer containing the antistatic agent has been very difficult to utilize for such as protecting films for color filters in view of the rise of the permittivity, and it has been very unsuitable to use for such as materials of flexographic printing and electrolyte layers of polymer battery in view of the lowering of the strength.

In addition, the ethylene oxide copolymer is a copolymer having an ether bond in its main chain, and has a property such that it (the portion of the ether bond) is weak against the strong heating (high temperature) in view of its molecular structure. Therefore, there has been a problem such that the polymer is decomposed during the above-mentioned heat-drying. In addition, in the above methods (1) and (2), new additional elements such as the poor solvent are necessary in addition to the heat-drying, and such as the increase of the cost of equipment accompanying at least two steps also has to be considered, and therefore there has also been a problem of the increase of the cost.

Furthermore, the ethylene oxide copolymer is frequently used in the form of a solution or paste. In such a case, when the ethylene oxide copolymer is once produced in a powdery form as is shown in the above methods (1) and (2), it is very difficult to carry out treatment in such as a case of adding a new solvent thereto in order to produce it in the form of a solution or paste, and therefore there is also a problem in view of usability.

On the one hand, when the ethylene oxide copolymer is used for uses such as protecting films for color filters and polyelectrolytes of polymer battery, the water content of the polymer is requested to lowly suppress in not more than a definite amount. However, in a state such that various conditions for obtaining a desirable polymer in such as the molecular weight are satisfied, and further that the water content is lowly controlled, it has not been easy to obtain the above polymer by the hitherto general methods.

When this water content cannot be controlled in not more than a definite amount, the permittivity of the polymer is unnecessarily raised, and there has been a problem such that: when it is used for such as protecting films for color filters, the protecting films are converted to conductors, and thereby the lowering of the function is caused. In addition, when the water content cannot be controlled in not more than a definite amount, this water reacts with such as metal ion components and then such as hydroxides are formed. Therefore, there has been a problem such that: when the above polymer is used, for example, for such as electrolyte layers for polymer battery, insulating layers are formed in the interface between the metal and the electrolyte layer, and thereby the voltage continues to increase under a constant electric current, and the cyclic efficiency of the battery is also deteriorated.

Accordingly, the present inventors have settled an object to provide a production process, in which, when an ethylene oxide copolymer is obtained, it is arranged that the copolymer should not contain an antistatic agent, and further its water content is also easily controlled in not more than a definite amount, and the thermal damage of the above polymer is prevented, and besides, the reduction of the cost can also be actualized. They have diligently studied in order to solve this. Then, in the course, they have taken note of a treatment method that involves purifying and recovering a polymer by devolatilization, which has hitherto been known as one step in a general production process for a polymer, and they have studied the effect as obtained by this treatment method. When the ethylene oxide copolymer is obtained, there has hitherto been not at all knowledge that: the above polymer is synthesized by polymerization using a solvent, and thereafter the polymer is purified and recovered through the devolatilization (evaporation) treatment. The above procedure has not been carried out as a matter of fact, either. Considering various effects as obtained by the devolatilization treatment, the present inventors have thought out that: in order to solve the above problems, the treatment step by the devolatilization should be included just when the ethylene oxide copolymer is obtained. That is to say, they have presumed that: the purification and recovery by heat-drying is not carried out due to the devolatilization treatment, and therefore it is not necessary to add the antistatic agent either, and there is no problem of the increase of the cost as mentioned above either, and the water content of the polymer can also easily be adjusted while the devolatilization treatment is carried out.

Accordingly, when the ethylene oxide copolymer is actually produced, subsequently to obtaining a polymerization product by the polymerization using a solvent, the devolatilization treatment of the polymer is carried out in combination. Then, it is confirmed that the above problems can be solved at a stroke.

When the devolatilization step is carried out, it may be arranged that: the above various stabilizers (e.g. antioxidants), and solvating agents should be added in the devolatilization step or should be added and blended after the devolatilization step.

In the devolatilization step, it is arranged that the ethylene oxide copolymer should be obtained by volatizing the solvent component (solvating agent as used as the solvent) from the products as obtained. However, the ethylene oxide copolymer as obtained is not limited to a copolymer containing no solvent component at all, but the copolymer is usually limited to a copolymer in which the solvent component has decreased and adjusted to a desirable solvent concentration by the devolatilization from a state of the product containing the solvent in a large amount, such as after the above polymerization step.

As to a devolatilization method and an apparatus and various conditions as used during the devolatilization, may be adopted such as an adoptable method during ordinary devolatilization, a usable apparatus, and various conditions as set. Their detailed explanations are shown below.

As to the devolatilization method, there are usually two steps that are a pre-devolatilization step and a main devolatilization. As to the order of the devolatilization, the main devolatilization step is favorably carried out after the pre-devolatilization step, but there is no especial limitation thereto. The devolatilization may be carried out as one step in which the pre-devolatilization step is not distinguished from the main devolatilization step. The reason why the devolatilization step is favorably divided into two steps and then carried out is because the devolatilization efficiency (e.g. reducing the cost, shortening the treatment time, and quality of the polymer) can be improved. The two steps are also theoretically favorable because of the following specific reasons: (1) the devolatilization treatment can be carried out slowly after a large amount of solvent in the product before the devolatilization is rapidly decreased to such an solvent amount that the devolatilization treatment can be carried out efficiently; (2) the former step is carried out by the devolatilization under ordinary pressure, and the latter step is carried out by the devolatilization under vacuum (reduced pressure), and therefore the machine size can be reduced in comparison with the case of the one-step treatment; and (3) there is a case where the increase of the viscosity is suddenly caused in a certain concentration range during the devolatilization, and therefore the driving system can be reduced in comparison with the case of the one-step treatment. However, depending upon such as the kind of the product to be subjected to the devolatilization treatment (especially, the kind of the polymer in the product), there is a case where even the above one-step treatment can be carried out in the same way as of the two-step treatment (the same effect can be obtained), and therefore the treatment may fitly be selected according to the object to be treated.

There is no especial limitation on apparatuses as used during the devolatilization (devolatilization apparatuses), but favorable examples thereof include stirring-tank evaporators, falling-film evaporators, thin-film evaporators, surface-renewal-type polymerization vessels, kneaders, roll mixers, intensive mixers (what is called, banbury mixers), and extruders. The devolatilization is favorably carried out by using at least one apparatus selected from these apparatuses. In addition, the using conditions can fitly be set depending upon the apparatus as used.

The stirring-tank evaporator is excellent in that it can match with a wide range of viscosity and a wide range of residual solvent concentration. Examples thereof include stirring tanks equipping with helical impellers, stirring tanks equipping with double-helical-ribbon impellers, concentric coaxial mixing vessels (e.g. product name: SUPERBLEND, made by Sumitomo Heavy Industries. Ltd.) equipped with SUPER BLEND impellers (inner impeller: MAX BLEND impeller, and outer impeller: mavable helical baffle), and VERTICAL CONE REACTOR (made by Mitsubishi Heavy Industries, Ltd.). These can be used in both of the batchwise treatment and continuous treatment, but these are favorably used in the batchwise treatment. In addition, the apparatuses match with a process in which such as a small quantity of polymers are precisely treated more favorably than with a process in which such as a large quantity of polymers are treated, because it takes much time during discharging after the treatment in view of properties of the apparatuses. In addition, when these are used, the evaporation process is carried out by renewal of heat-transferred face.

Of the above various stirring-tank evaporators, the concentric coaxial mixing vessel can especially be given such as the following excellent characteristics (1) to (6): (1) the treatment viscosity range is wide, and the excellent blend-ability can be displayed in the viscosity range of 1 to 10,000 poise; (2) following the sudden change of viscosity in the tank, the blending functions of the inner and outer impellers naturally change and match therewith, and therefore the good fluid state can be preserved; (3) the high uniformity of the temperature can be preserved, and the deterioration of the polymer quality can be lowered because the flow rate of the liquid at the wall face in the tank and in the center of the tank can be uniformly adjusted; (4) the slip and the residence of the low-viscosity liquid on the high-viscosity liquid disappear, and the dispersibility of such as reflux-condensing liquids and various additives after the polymerization can be improved; (5) the cohesion and accumulation at the tank wall and the baffle portion can disappear during the treatment of high-concentration slurry, and the good slurry dispersibility is displayed; and (6) the cohesion at the inner wall portion, and the time for washing the inside of the tank and its frequency can be lowered because of the stable flow rate at the wall face, which is caused by rotating the outer impeller that is close to the wall face of the tank.

Favorable examples of the falling-film evaporators include shell-and-tube-heat-exchanger-type evaporators (e.g. product name: Sulzer Mixer, made by Sumitomo Heavy Industries. Ltd.; and product name: Static Mixer, made by Noritake Co., Ltd.), and plate-heat-exchanger-type evaporators (e.g. product name: Hiviscous Evaporator, made by Mitsui Engineering & Shipbuilding Co., Ltd.). These can be used in both of the batchwise treatment and continuous treatment, and both of the treatments can favorably be carried out. In addition, in the devolatilization by these apparatuses, the heating is carried out by sensible heat in view of properties of the apparatuses. Thereafter, the sensible heat is converted to latent heat under reduced pressure, and then the evaporation is carried out. Therefore, the amount that can be devolatilized depends upon the sensible-heat amount as heated (heat amount transferable as the latent heat). Accordingly, favorable is a process in which the treatment amount matches with the sensible-heat amount as heated. However, the heat transfer can be promoted by stick mixers in the shell-and-tube-heat-exchanger-type evaporator, and therefore it can also match with a process with a wide range of the treatment amount. In addition, in the case of the shell-and-tube-heat-exchanger-type evaporator, the evaporation process is carried out by the expansion of interface area, and the highest treatment viscosity as matched is favorably 50,000 poise. In the case of the plate-heat-exchanger-type evaporator, the evaporation process is carried out by the expansion of heat-transferred area, and the highest treatment viscosity as matched is favorably 10,000 poise.

The thin-film evaporator is excellent in the respect that it can form uniform liquid film by acting centrifugal force with blades. Examples thereof include horizontal thin-film evaporators (e.g. product name: EVA reactor, made by Kansai Chemical Engineering Co., Ltd.), fixed-blade-type vertical thin-film evaporators (e.g. product named: EXEVA, made by Shinko Pantec Co., Ltd.), movable-blade-type vertical thin-film evaporators (e.g. product named: WIPRENE, made by Shinko Pantec Co., Ltd.), and tank-type (mirror-type) thin-film evaporators (e.g. product name: Recovery, made by Kansai Chemical Engineering Co., Ltd.). In the batchwise treatment with these evaporators, the horizontal and tank-type evaporators are not common but can be used, and the vertical evaporators cannot be used whether they are fixed-blade-type or movable-blade-type. In addition, in the continuous treatment, all the evaporators can be carried out. In view of properties of the apparatuses, as to all these apparatuses, the heating is carried out by sensible heat, and thereafter the sensible heat is converted to latent heat under reduced pressure, and then the evaporation is carried out. Therefore, the amount that can be devolatilized depends upon the sehsible-heat amount as heated (heat amount transferable as the latent heat). Accordingly, favorable is a process in which the treatment amount matches with the sensible-heat amount as heated. In addition, as to all these apparatuses, the evaporation process is carried out by renewal of heat-transferred face.

In the horizontal thin-film evaporator, it is difficult to match with high viscosity on the discharging face in comparison with the vertical thin-film evaporator. Therefore, blades having excellent discharging effects are used, and the horizontal thin-film evaporator is made in order that it can match with the high viscosity, and the highest treatment viscosity as matched is favorably 500 poise. In the vertical thin-film evaporator, the high-viscosity liquid is more suitable than the low-viscosity liquid because of dropping down by its own weight, but the highest treatment viscosity as matched is favorably 1,000 poise in the movable-blade-type vertical thin-film evaporator. In addition, the fixed-blade-type vertical thin-film evaporator matches with the high viscosity by giving the fixed blade the effects of sweeping down, and the highest treatment viscosity as matched is favorably 10,000 poise. In the tank-type thin-film evaporator, the short path of the low-viscosity liquid can be suppressed by utilizing a mirror, and the highest treatment viscosity as matched is favorably 1,000 poise.

The surface-renewal-type polymerization vessel (horizontal thin-film polymerization vessel) is excellent in displaying high devolatilability by renewal of gas-liquid surface. Favorable examples thereof include single-screw surface-renewal-type polymerization vessels, and twin-screw surface-renewal-type polymerization vessels (e.g. product name: BIVOLAK, made by Sumitomo Heavy Industries. Ltd.; product name: Hitachi spectacle-shaped blade polymerization machine, made by Hitachi, Ltd.; Hitachi lattice-blade polymerization machine, made by Hitachi, Ltd.; and product name: SC processor, made by Kurimoto, Ltd.). These polymerization vessels cannot be used in the batchwise treatment, but all can be used in the continuous treatment. In view of properties of the apparatuses, as to all these apparatuses, the treatment amount of the devolatilization depends upon the transferring rate of substances in the apparatuses, and the evaporation process is carried out by renewal of gas-liquid surface.

The kneader, roll mixer, and intensive mixer (what is called, a banbury mixer) are suitable for blending such as high-viscosity molten products similarly to the extruder, and they are provided with devolatilability as an additional function. These can be used all in both of the batchwise treatment and continuous treatment. As to these apparatuses, the highest treatment viscosity as matched is favorably 10,000 poise.

The single-screw apparatus can ensure the surface area efficiently, and therefore displays high devolatilability, and the highest treatment viscosity as matched is favorably 10,000 poise. In addition, the twin-screw apparatus is excellent in self-cleaning ability due to little dead space and high piston flowability in the vessel, and in suppressing the residence of the liquid, and the highest treatment viscosity as matched is favorably 10,000 poise.

The extruder is suitable for blending such as high-viscosity melted products, and provided with devolatilability together with heating, melting, and kneading as additional functions. Favorable examples thereof include single-screw extruders, twin-screw extruders (e.g. product name: SUPERTEXαII, made by Japan Steel Works, Ltd.; and product name: BT-30-S2, made by Plastic Technology Laboratory), and a SCR self-cleaning-type reactor (made by Mitsubishi Heavy Industries, Ltd.). These cannot be used in the batchwise treatment, but all can be used in the continuous treatment. In view of properties of the apparatuses, as is mentioned above, these are suitable for a process in which the devolatilization treatment of a material having very high viscosity as an object is carried out, and the evaporation process is carried out by such as kneading and evaporation.

In the extruders, as to both of the single-screw extruders and twin-screw extruders, the highest treatment viscosity as matched is favorably 100,000 poise.

As is mentioned above, favorable examples of the devolatilization method include a method in which the main devolatilization step is favorably carried out after the pre-devolatilization step. Of the above various devolatilization apparatuses, there is no especial limitation on the apparatuses that can be used for the pre-devolatilization step, but examples thereof include the stirring tanks equipping with double-helical-ribbon impellers, concentric coaxial mixing vessels equipped with SUPER BLEND impellers, plate-heat-exchanger-type falling-film evaporators and fixed-blade-type vertical thin-film evaporators. In addition, there is no especial limitation on the apparatuses that can be used for the main devolatilization step, but examples thereof include the fixed-blade-type vertical thin-film evaporators, twin-screw surface-renewal-type polymerization vessels, kneaders, and twin-screw extruders.

When the devolatilization step is carried out, the devolatilization may be carried out by connecting the above enumerated various devolatilization apparatuses to what is called the apparatus for the preceding step, which is subjected to such as the above-mentioned polymerization step and aging step, or may be carried out with the various devolatilization apparatuses after inserting the liquid transfer or transportation from the above preceding apparatus that is subjected to such as the polymerization step. Examples of the latter case include: a form such that a liquid-transfer line is connected from the above apparatus for the preceding step to the devolatilization apparatus, and a form such that a midway tank (cushion tank) equipped with a jacket and a stirring machine is arranged between the above apparatus for the preceding step and the devolatilization apparatus.

In the devolatilization step, it is arranged that the residual solvent concentration in the product after the devolatilization should be favorably in the range of 0.01 to 30 weight %, more favorably 0.05 to 20 weight %, still more favorably 0.1 to 10 weight %. In the case where the above residual solvent concentration is less than 0.01 weight %, it is necessary to restrict the devolatilization condition strictly, and therefore there is a possibility that: it leads to the thermal deterioration of the ethylene oxide copolymer, and finally the lowering of the performance is caused. In the case where the residual solvent concentration is more than 30 weight %, there is a possibility that: the tack is caused in the ethylene oxide copolymer after the devolatilization, and such as the blocking is caused.

In the devolatilization step, the water content of the product after the devolatilization is favorably adjusted at the same time as the devolatilization of the solvent. The water is contained in such as the solvent and monomers that are used during the polymerization. Specifically, the above water content is favorably adjusted to not more than 5,000 ppm, more favorably not more than 500 ppm, still more favorably not more than 200 ppm. In the case where the above water content is more than the above range, the permittivity of the ethylene oxide copolymer is raised unnecessarily. Therefore, when the above copolymer is used, for example, in usage fields such as protecting films for color filters, there is a possibility that the fatal lowering of the function is caused as the above protecting film because the above copolymer is conductive. In addition, there is a possibility that: the water reacts with such as metal ion components and then such as hydroxides are formed. Therefore, when the above copolymer is used, for example, for such as electrolyte layers for polymer battery, there is a possibility that: insulating layers are formed in the interface between the metal and the electrolyte layer, and the voltage continues to increase under a constant electric current, and the cyclic efficiency of the battery is also deteriorated.

There is no especial limitation on means of adjusting the above water content, but favorable examples thereof include: to raise the devolatilization temperature and/or to increase the reduced-pressure degree during the devolatilization treatment (incidentally, to increase the reduced-pressure degree means to lower the pressure, and to reduce the reduced-pressure degree means to raise the pressure). When the devolatilization temperature is raised to adjust the water content, there is no especial limitation on the temperature. However, if the temperature is too low, it is not efficient because the reduced-pressure degree has to be increased to excess. If the temperature is too high, there is a possibility that the thermal deterioration of the ethylene oxide copolymer is caused. Therefore, it is arranged that the devolatilization temperature should fitly be set in consideration of these. In addition, when the reduced-pressure degree of the devolatilization is increased to adjust the water content, there is no especial limitation on the reduced-pressure degree. However, if the reduced-pressure degree is too large, it is thought difficult in consideration of sealability of the apparatus. If the reduced-pressure degree is too small, there is a possibility that: the water content cannot be controlled to not more than 200 ppm unless the devolatilization temperature is considerably raised. Therefore, it is arranged that the reduced-pressure degree should fitly be set in consideration of these.

When the present invention production process is a process comprising the above devolatilization step, the necessity of containing the antistatic agent in the product after the devolatilization, and besides, in the ethylene oxide copolymer can vanish. The reason is because: if the devolatilization step is carried out, the ethylene oxide copolymer as formed after such as the polymerization step is not recovered in a dried state by such as heating, but can be recovered while a fluid state is kept by volatilizing the solvent component under heated conditions, and therefore it is not necessary to consider the electrification of the polymer caused by such as friction between dried polymers. When the ethylene oxide copolymer as obtained contains the antistatic agent, it is possible that: the permittivity of the ethylene oxide copolymer is raised unnecessarily, or the lowering of the crosslinking degree and the increase of the moisture absorbency are caused, and then the swelling capacity of the above copolymer is increased unnecessarily, and the strength is lowered. Accordingly, when the ethylene oxide copolymer as obtained is used, for example, for such as protecting films for color filters, there is a possibility that the fatal lowering of the function is caused as the above protecting film because the above copolymer is conductive. In addition, when the above copolymer is used for such as materials of flexographic printing, there is a possibility that the image reproducibility is also deteriorated because the desirable shape and the repulsion elasticity are difficult to maintain. Furthermore, when the above copolymer is used for such as separators, electrodes and electrolyte layers of polymer battery, there is a possibility that the desirable shape cannot be maintained.

When the solvent component is volatilized from the product (the devolatilization of the solvent component from the product is carried out) under heated conditions by using the above-mentioned devolatilization apparatus, the temperature is favorably in the range of 40 to 300° C., more favorably 60 to 250° C., still more favorably 90 to 200° C. The product having the above-mentioned desirable residual solvent concentration and water content can be obtained after the devolatilization by carrying out the devolatilization in this temperature range. In the case where the temperature is lower than 40° C., there is a possibility that the residual solvent is increased. In the case where the temperature is higher than 300° C., there is a possibility that the thermal decomposition of the ethylene oxide copolymer itself is caused. Herein, the above temperature means a temperature of the product containing the ethylene oxide copolymer in the devolatilization apparatus.

Similarly, when the solvent component is volatilized from the product (the devolatilization of the solvent component from the product is carried out) under heated conditions by using the above-mentioned devolatilization apparatus, the devolatilization is favorably carried out under a pressure of 13 to 100,000 Pa, more favorably 133 to 70,000 Pa, still more favorably 1,333 to 40,000 Pa. The product having the above-mentioned desirable residual solvent concentration and water content can be obtained after the devolatilization by carrying out the devolatilization under this pressure range. In the case where the above pressure is lower than 13 Pa, there is a possibility that the solvent is flashed and the foaming is caused. In the case where the pressure is higher than 100,000 Pa, there occurs a case where the temperature has to be raised up to such an extent that the ethylene oxide copolymer itself is decomposed. Herein, the above pressure means a pressure in the devolatilization apparatus.

In the present invention production process, it is arranged that: the viscosity of the product containing the ethylene oxide copolymer after the devolatilization should favorably be in the range of 50 to 100,000 poise at 100° C., more favorably 100 to 80,000 poise at 100° C., still more favorably 220 to 60,000 poise at 100° C. In the case where the above viscosity is less than 50 poise at 100° C., there is a possibility that: the residual solvent is increased, and the tack and foaming are caused when the ethylene oxide copolymer is molded to a molded product. In the case where the above viscosity is more than 100,000 poise at 100° C., there is a possibility that: it is difficult to carry out the devolatilization in the devolatilization apparatus.

The weight-average molecular weight (Mw) and molecular weight distribution (Mw/Mn) of the ethylene oxide copolymer as obtained by the present invention production process can fitly be adjusted to desirable values in such a range as not to lack the practicability such that the viscosity of the above copolymer as obtained is not lowered unnecessarily.

The ethylene oxide copolymer as obtained by the present invention is not especially limited, but it can favorably be used as a polymer material for wide-ranging uses. Specific examples thereof include: polyurethane resins (e.g. adhesives, paints, sealing agents, elastomers, and floor-polishing agents); and besides hard, soft, or half-hard polyurethane resins; and further, surfactants, sanitary products, deinking agents, lubricating oils, engine-starting liquids, and polyelectrolytes.

(Effects and Advantages of the Invention)

The present invention can provide a production process, in which, when an ethylene oxide copolymer is obtained, conditions for obtaining a copolymer having a desirable molecular weight with ease and good reproducibility are provided.

DETAILED DESCRIPTION OF THE PREFERRED EMBODIMENTS

Hereinafter, the present invention is more specifically illustrated by the following examples. However, the present invention is not limited to these examples in any way. Incidentally, hereinafter, the units "part(s) by weight", "hour (s)", and "liter(s)" simply denote "part(s)", "h", and "L" respectively for the sake of convenience. In addition, the unit "weight" (e.g. "weight %" and "weight/weight") denotes "wt" (e.g. "wt %" and "wt/wt").

Various conditions of measurement, setting, and treatment in the below-mentioned examples and comparative examples are shown below.

[Setting of Stirring Power (Pv)]

The viscosity of a reaction mixture was set to 20,000 cps at the end of the polymerization reaction, and the rotation number of stirring blades for setting to a desirable stirring power was calculated on the basis of the capacity of the contents of the reaction mixture in the polymerization vessel at the end of the polymerization reaction and the shape of the polymerization vessel such as a blade shape. Its corresponding relationship is shown in Table 1 below.

| Stirring power Pv (kw/m³) | Capacity of reaction vessel (L) | Rotation number of stirring blades (rpm) |
|---|---|---|
| 16 | 100 | 259 |
|  | 1 | 300 |
| 5 | 100 | 152 |
|  | 1 | 170 |
| 2.6 | 100 | 118 |
|  | 1 | 130 |

-continued

| Stirring power Pv (kw/m³) | Capacity of reaction vessel (L) | Rotation number of stirring blades (rpm) |
|---|---|---|
| 1 | 100 | 68 |
|  | 1 | 76 |
| 0.5 | 100 | 40 |

[Dehydration Treatment Using Molecular-sieve]

To a raw monomer that was tried to dry, 10 wt % of molecular sieve was added, and thereafter the replacement with nitrogen was carried out.

In addition, 100 L of toluene as used was passed through a column of the molecular sieve, and thereby the dehydration treatment was continuously carried out.

Incidentally, the molecular sieve as used is produced by Union Showa Co., Ltd. (product name: Molecular Sieve (type: 4A 1.6)).

[Measurement of Water Content in Solvent]

The water content was measured by using a Karl-Fischer apparatus for measuring water content (coulometric titration method, AQ-7, made by Hiranuma Sangyo).

[Measurement of Weight-Average Molecular Weight (Mw) and Molecular Weight Distribution (Mw/Mn)]

They were measured with a GPC apparatus in which the calibration curve was prepared by using a standard molecular-weight sample of polyethylene oxide. The measurement was carried out after the reaction mixture (including the polymer) as obtained after the reaction was dissolved in a predetermined solvent.

EXAMPLE 1

A reaction vessel of 100 L as equipped with MAX BLEND impeller (made by Sumitomo Heavy Industries. Ltd.), a jacket, and an addition inlet was washed with a solvent, and thereafter it was heat-dried and replaced with nitrogen. To this reaction vessel, 200 parts of toluene as dehydration-treated with molecular sieve and 0.8 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.4 MPa, and the temperature of the reaction vessel was raised by passing warm water into the jacket while being stirred by rotating the MAX BLEND impeller at 259 rpm (Pv=16).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were constantly supplied thereto at supplying rates of 36 parts/h and 4 parts/h respectively (amount of ethylene oxide as supplied: 180 parts in total, and amount of monomer mixture as supplied: 20 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 100,000.

EXAMPLE 2

A reaction vessel of 100 L as equipped with MAX BLEND impeller (made by Sumitomo Heavy Industries. Ltd.), a jacket, and an addition inlet was washed with a solvent, and thereafter it was heat-dried and replaced with nitrogen. To this reaction vessel, 420 parts of toluene as dehydration-treated with molecular sieve and 1.7 parts of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.3 MPa, and the temperature of the reaction vessel was raised by passing warm water into the jacket while being stirred by rotating the MAX BLEND impeller at 152 rpm (Pv=5).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were constantly supplied thereto at supplying rates of 75.6 parts/h and 8.4 parts/h respectively (amount of ethylene oxide as supplied: 378 parts in total, and amount of monomer mixture as supplied: 42 parts in total). During the supply, the supply and the interruption of the supply of the raw monomers were fitly repeated because the rise of the internal temperature and the rise of the internal pressure due to heat of polymerization were extreme in comparison with the case of Example 1, and then the reaction was carried out at 100° C.±5° C. while the rise of the internal temperature and the rise of the internal pressure were checked and controlled.

After the end of the supply, the aging was carried out by further being kept at not lower than 90° C. for 5 hours.

By the above procedure, obtained was a reaction mixture including a polymer having a weight-average molecular weight Mw of 90,000.

EXAMPLE 3

A reaction vessel of 100 L as equipped with MAX BLEND impeller (made by Sumitomo Heavy Industries. Ltd.), a jacket, and an addition inlet was washed with a solvent, and thereafter it was heat-dried and replaced with nitrogen. To this reaction vessel, 420 parts of toluene as dehydration-treated with molecular sieve and 1.7 parts of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.3 MPa, and the temperature of the reaction vessel was raised by passing warm water into the jacket while being stirred by rotating the MAX BLEND impeller at 152 rpm (Pv=5).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were constantly supplied thereto, at supplying rates of 75.6 parts/h and 8.4 parts/h respectively for 2.5 hours, and thereafter the supplying rates were lowered to 37.8 parts/h and 4.2 parts/h respectively, and they were further constantly supplied thereto for 5 hours (amount of ethylene oxide as supplied: 378 parts in total, and amount of monomer mixture as supplied: 42 parts in total). The reaction was carried out at 100° C.±5° C. while the rise of the internal temperature and the rise of the internal pressure due to heat of polymerization were checked and controlled during the supply. In Example 3, the supplying rates were decreased in the latter part of the reaction, and therefore the rise of the internal temperature and the rise of the internal pressure due to the heat of polymerization were mild during the supply in comparison with the case of Example 2.

After the end of the supply, the aging was carried out by further being kept at not lower than 90° C. for 5 hours.

By the above procedure, obtained was a reaction mixture including a polymer having a weight-average molecular weight Mw of 95,000.

EXAMPLE 4

A reaction mixture including a polymer having a weight-average molecular weight Mw of 84,000 was obtained in the same way as of Example 3 except that the stirring was carried out by rotating the MAX BLEND impeller at 118 rpm (Pv=2.6) in Example 3.

EXAMPLE 5

A reaction mixture including a polymer having a weight-average molecular weight Mw of 66,000 was obtained in the same way as of Example 3 except that: in Example 3, the stirring was carried out by rotating the MAX BLEND impeller at 68 rpm (Pv=1), and the ethylene oxide and the monomer mixture including the butylene oxide and the methyl glycidyl ether were supplied thereto for 12.5 hours at supplying rates of 30.2 parts/h and 3.4 parts/h respectively (amount of ethylene oxide as supplied: 377.5 parts in total, and amount of monomer mixture as supplied: 42.5 parts in total).

EXAMPLE 6

A reaction mixture including a polymer having a weight-average molecular weight Mw of 103,000 was obtained in the same way as of Example 4 except that the amount of the potassium t-butoxide (12.6 wt % tetrahydrofuran (THF) solution) as used was changed to 1.3 parts in Example 4.

EXAMPLE 7

A reaction mixture including a polymer having a weight-average molecular weight Mw of 91,000 was obtained in the same way as of Example 6 except that: in Example 6, the stirring was carried out by rotating the MAX BLEND impeller at 68 rpm (Pv=1), and the ethylene oxide and the monomer mixture including the butylene oxide and the methyl glycidyl ether were supplied thereto for 12.5 hours at supplying rates of 30.2 parts/h and 3.4 parts/h respectively (amount of ethylene oxide as supplied: 377.5 parts in total, and amount of monomer mixture as supplied: 42.5 parts in total).

Comparative Example 1

A reaction mixture including a polymer having a weight-average molecular weight Mw of 77,000 was obtained in the same way as of Example 6 except that: in example 6, the stirring was carried out by rotating the MAX BLEND impeller at 40 rpm (Pv=0.5), and the ethylene oxide and the monomer mixture including the butylene oxide and the methyl glycidyl ether were supplied thereto under the following three-stage supplying condition respectively (amount of ethylene oxide as supplied: 376.38 parts in total, and amount of monomer mixture as supplied: 41.82 parts in total).
(Supplying Condition)

First stage: The ethylene oxide and the monomer mixture were supplied thereto at supplying rates of 40.5 parts/h and 4.5 parts/h respectively for 3.4 hours.

Second stage: Subsequent to the first stage, the supplying rates of the ethylene oxide and the monomer mixture were lowered to 35.1 parts/h and 3.9 parts/h respectively and they were further supplied thereto for 3.4 hours.

Third stage: Subsequent to the second stage, the supplying rates of the ethylene oxide and the monomer mixture were changed to 15.3 parts/h and 1.7 parts/h respectively and they were further supplied thereto for 7.8 hours.

EXAMPLE 8

A reaction mixture including a polymer having a weight-average molecular weight Mw of 97,000 was obtained in the same way as of Example 6 except that the monomer mixture including the butylene oxide and the methyl glycidyl ether as dehydration-treated with molecular sieve (blending ratio (wt/wt): butylene oxide/methyl glycidyl ether=6/4) was changed to a monomer mixture including butylene oxide and allyl glycidyl ether as not dehydration-treated with molecular sieve (blending ratio (wt/wt): butylene oxide/allyl glycidyl ether=6/4) in Example 6.

EXAMPLE 9

A polymer having a weight-average molecular weight Mw of 104,000 was obtained in the same way as of Example 6 except that the reaction temperature was controlled to 115° C. during the supply of the raw monomers in example 6.

Comparative Example 2

A reaction mixture including a polymer having a weight-average molecular weight Mw of 57,000 was obtained in the same way as of Example 6 except that: in Example 6, the supply of the raw monomers were initiated after the temperature reached 100° C., and the reaction temperature was controlled to 120° C. during the supply.

Comparative Example 3

A reaction mixture including a polymer having a weight-average molecular weight Mw of 34,000 was obtained in the same way as of Example 6 except that: in Example 6, the supply of the raw monomers were initiated after the temperature reached 125° C., and the reaction temperature was controlled to 140° C. during the supply.

Comparative Example 4

The same procedure as of Example 4 was carried out except that toluene of which the water content was adjusted to 85 ppm (water/reaction initiator=1.06 mol/mol) was used instead of the dehydration-treated toluene in Example 4. However, the polymerization reaction did not proceed, and a reaction mixture including a polymer was not obtained.

Comparative Example 5

The same procedure as of Example 4 was carried out except that toluene of which the water content was adjusted to 74 ppm (water/reaction initiator=0.92 mol/mol) was used instead of the dehydration-treated toluene in Example 4. However, the heat as caused by the polymerization reaction was not recognized during the supply, and therefore the reaction was completed after 1 hour passed. Then, as a result, obtained was a reaction mixture including a polymer having a weight-average molecular weight Mw of 17,000. From the correlation between the amount of the raw monomers as utilized for the reaction and the Mw of the polymer, the reaction itself seemed to have no problem, but the reaction rate were greatly lowered.

EXAMPLE 10

A reaction mixture including a polymer having a weight-average molecular weight Mw of 26,000 was obtained in the same way as of Example 6 except that a monomer mixture including butylene oxide and epoxybutene (blending ratio (wt/wt): butylene oxide/epoxybutene=6/4) was used instead of the monomer mixture including the butylene oxide and the methyl glycidyl ether (blending ratio (wt/wt): butylene oxide/methyl glycidyl ether=6/4) in Example 6.

EXAMPLE 11

A reaction vessel of 1 L as equipped with MAX BLEND impeller (made by Sumitomo Heavy Industries. Ltd.), a jacket, and an addition inlet was washed With a solvent, and thereafter it was heat-dried and replaced with nitrogen. To this reaction vessel, 200 parts of toluene as dehydration-treated with molecular sieve and 0.8 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.4 MPa, and the temperature of the reaction vessel was raised by passing warm water into the jacket while being stirred by rotating the MAX BLEND impeller at 300 rpm (Pv=16).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were constantly supplied thereto at supplying rates of 36 parts/h and 10 parts/h respectively for 2 hours. After the supply for 2 hours, the ethylene oxide was further constantly supplied thereto at a supplying rate of 36 parts/h for 3 hours(amount of ethylene oxide as supplied: 180 parts in total, and amount of monomer mixture as supplied: 20 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 110,000.

EXAMPLE 12

A reaction vessel of 1 L as equipped with MAX BLEND impeller (made by Sumitomo Heavy Industries. Ltd.), a jacket, and an addition inlet was washed with a solvent, and thereafter it was heat-dried and replaced with nitrogen. To this reaction vessel, 200 parts of toluene as dehydration-treated with molecular sieve and 0.8 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.4 MPa, and the temperature of the reaction vessel was raised by passing warm water into the jacket while being stirred by rotating the MAX BLEND impeller at 300 rpm (Pv=16).

After it was confirmed that the internal temperature reached 90° C., ethylene oxide was constantly supplied thereto at a supplying rate of 36 parts/h. After 1 hour passed from the beginning of the above supply, a monomer mixture including butylene oxide and methyl glycidyl ether as dehydration-treated with molecular sieve (blending ratio (wt/wt): butylene oxide/methyl glycidyl ether=6/4) was constantly supplied thereto at a supplying rate of 5 parts/h (amount of ethylene oxide as supplied: 180 parts in total, and amount of monomer mixture as supplied: 20 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 117,000.

EXAMPLE 13

A reaction vessel of 1 L as equipped with a MAX BLEND impeller (made by Sumitomo Heavy Industries. Ltd.), a jacket, and an addition inlet was washed with a solvent, and thereafter it was heat-dried and replaced with nitrogen. To this reaction vessel, 200 parts of toluene as dehydration-treated with molecular sieve and 0.8 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.4 MPa, and the temperature of the reaction vessel was raised by passing warm water into the jacket while being stirred by rotating the MAX BLEND impeller at 300 rpm (Pv=16).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were supplied thereto in a lump (amount of ethylene oxide as supplied: 180 parts in total, and amount of monomer mixture as supplied: 2 parts in total).

After the heat as caused by the polymerization reaction was confirmed, the ethylene oxide and the monomer mixture including the butylene oxide and the methyl glycidyl ether as dehydration-treated with molecular sieve (blending ratio (wt/wt): butylene oxide/methyl glycidyl ether=6/4) were constantly supplied thereto at supplying rates of 36 parts/h and 4.0 parts/h respectively (amount of ethylene oxide as supplied: 162 parts in total, and amount of monomer mixture as supplied: 18 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 130,000.

EXAMPLE 14

A reaction vessel of 1 L as equipped with MAX BLEND impeller (made by. Sumitomo Heavy Industries. Ltd.), a jacket, and an addition inlet was washed with a solvent, and thereafter it was heat-dried and replaced with nitrogen. To this reaction vessel, 285 parts of toluene as dehydration-treated with molecular sieve and 1.2 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.3 MPa, and the temperature of the reaction vessel was raised by passing warm water into the jacket while being stirred by rotating the MAX BLEND impeller at 130 rpm (Pv=3).

After it was confirmed that the internal temperature reached 90° C., ethylene oxide and a monomer mixture including butylene oxide and methyl glycidyl ether as dehydration-treated with molecular sieve (blending ratio (wt/wt): butylene oxide/methyl glycidyl ether=6/4) were constantly supplied thereto under the following ten-stage supplying condition (amount of ethylene oxide as supplied: 257 parts in total, and amount of monomer mixture as supplied: 28 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 80,000.

(Supplying Condition)

First stage: Only the ethylene oxide is supplied thereto at a supplying rate of 51.4 parts/h for 30 minutes.

Second to fifth stages: After 10 minutes have passed after the end of the supply of the former stage, the monomer mixture is supplied thereto at a supplying rate of 10.5 parts/h for 20 minutes, and thereafter the ethylene oxide is supplied thereto at a supplying rate of 51.4 parts/h for 30 minutes.

Sixth to ninth stages: After 10 minutes have passed after the end of the supply of the former stage, the monomer mixture is supplied thereto at a supplying rate of 10.5 parts/h for 20 minutes, and thereafter the ethylene oxide is supplied thereto at a supplying rate of 25.7 parts/h for 60 minutes.

Tenth stage: After 10 minutes have passed after the end of the supply of the ninth stage, the ethylene oxide is supplied thereto at a supplying rate of 25.7 parts/h for 60 minutes.

EXAMPLE 15

A reaction mixture including a polymer having a weight-average molecular weight Mw of 79,000 was obtained in the same way as of Example 14 except that: in Example 14, the ten-stage supplying condition was changed below, and then the ethylene oxide and the monomer mixture were supplied thereto (amount of ethylene oxide as supplied: 257 parts in total, and amount of monomer mixture as supplied: 28 parts in total).

(Supplying Condition)

First stage: Only the ethylene oxide is supplied thereto at a supplying rate of 51.4 parts/h for 30 minutes.

Second to fifth stages: After 10 minutes have passed after the end of the supply of the former stage, the ethylene oxide is supplied thereto at a supplying rate of 51.4 parts/h for 30 minutes, and the monomer mixture is supplied thereto at a supplying rate of 21 parts/h for 10 minutes. In each stage, it is arranged that the supply of the ethylene oxide and the supply of the monomer mixture should be initiated at the same time. Accordingly, it is arranged that: only the supply of the monomer mixture should be first interrupted after 10 minutes have passed from the beginning of the supply, and the ethylene oxide should be further supplied for 20 minutes too long, and thereby the supply of each stage should be completed.

Sixth to ninth stages: After 10 minutes have passed after the end of the supply of the former stage, the ethylene oxide is supplied thereto at a supplying rate of 25.7 parts/h for 60 minutes, and the monomer mixture is supplied thereto at a supplying rate of 10.5 parts/h for 20 minutes. In each stage, it is arranged that the supply of the ethylene oxide and the supply of the monomer mixture should be initiated at the same time. Accordingly, it is arranged that: only the supply of the monomer mixture should be first interrupted after 20 minutes have passed from the beginning of the supply, and the ethylene oxide should be further supplied for 40 minutes too long, and thereby the supply of each stage should be completed.

Tenth stage: After 10 minutes have passed after the end of the supply of the ninth stage, only the ethylene oxide is supplied thereto at a supplying rate of 25.7 parts/h for 60 minutes.

EXAMPLE 16

A reaction mixture including a polymer having a weight-average molecular weight Mw of 94,000 was obtained in the same way as of Example 14 except that: in Example 14, the ten-stage supplying condition was changed below, and then the ethylene oxide and the monomer mixture were supplied thereto (amount of ethylene oxide as supplied: 257 parts in total, and amount of monomer mixture as supplied: 27.9 parts in total).

(Supplying Condition)

The ethylene oxide was supplied thereto at a supplying rate of 51.4 parts/h for 2.5 hours, and thereafter the supplying rate was lowered to 25.7 parts/h, and then the ethylene oxide was further supplied thereto for 5 hours.

The monomer mixture was supplied thereto by adding 3.1 parts in a lump every time that 30 minutes passed after the beginning of the supply of the ethylene oxide, and this supply was repeated nine times.

EXAMPLE 17

A reaction mixture including a polymer having a weight-average molecular weight Mw of 110,000 was obtained in the same way as of Example 8 except that: in Example 8, the supplying condition was changed below, and then the ethylene oxide, the butylene oxide, and the allyl glycidyl ether were supplied thereto (amount of ethylene oxide as supplied: 378 parts in total, amount of butylene oxide as supplied: 25 parts in total, and amount of allyl glycidyl ether as supplied: 16.8 parts in total).

(Supplying Condition)

The supply of the ethylene oxide and the supply of the butylene oxide were initiated at the same time under the following conditions.

Ethylene oxide: The ethylene oxide was supplied thereto at a supplying rate of 75.6 parts/h for 2.5 hours, and thereafter the supplying rate was lowered to 37.8 parts/h, and it was further supplied thereto for 5 hours.

Butylene oxide: The butylene oxide was supplied thereto at a supplying rate of 5 parts/h for 2.5 hours, and thereafter the supplying rate was lowered to 2.5 parts/h, and it was further supplied thereto for 5 hours.

On the other hand, 5.6 parts of the allyl glycidyl ether was each supplied thereto on lump addition when 30, 120, and 270 minutes passed after the beginning of the supply of the ethylene oxide and the butylene oxide.

EXAMPLE 18

A reaction vessel of 100 L as equipped with MAX BLEND impeller (made by Sumitomo Heavy Industries, Ltd.), a jacket, and an addition inlet was washed with a solvent, and thereafter it was heat-dried and replaced with nitrogen. To this reaction vessel, 422 parts of toluene as dehydration-treated with molecular sieve and 1.3 parts of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.3 MPa, and the temperature of the reaction vessel was raised by passing warm water into the jacket while being stirred by rotating the MAX BLEND impeller at 118 rpm (Pv=2.6).

After it was confirmed that the internal temperature reached 90° C., ethylene oxide and a monomer mixture including butylene oxide and allyl glycidyl ether as dehydration-treated with molecular sieve (blending ratio (wt/wt): butylene oxide/allyl glycidyl ether=3.3/0.4) were each supplied thereto under the following supplying condition (amount of ethylene oxide as supplied: 384.8 parts in total, and amount of monomer mixture as supplied: 37.3 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 97,000.
(Supplying Condition)

The ethylene oxide was supplied thereto at a supplying rate of 76.9 parts/h for 2.5 hours, and thereafter the supplying rate was lowered to 38.5 parts/h, and it was further supplied thereto for 5 hours.

The monomer mixture including the butylene oxide and the allyl glycidyl ether was supplied thereto at a supplying rate of 9.4 parts/h for 2.0 hours after 30 minutes passed from the beginning of the supply of the above ethylene oxide, and thereafter the supplying rate was lowered to 3.7 parts/h, and it was further supplied thereto for 5 hours.

EXAMPLE 19

A reaction mixture including a polymer having a weight-average molecular weight Mw of 90,000 was obtained in the same way as of Example 18 except that: in Example 18, the ethylene oxide and a monomer mixture including butylene oxide and allyl glycidyl ether as dehydration-treated with molecular sieve (blending ratio (wt/wt): butylene oxide/allyl glycidyl ether=1.3/1.0) were used and each supplied thereto under the following supplying condition (amount of ethylene oxide as supplied: 398.0 parts in total, and amount of monomer mixture as supplied: 24.0 parts in total).
(Supplying Condition)

The ethylene oxide was supplied thereto at a supplying rate of 79.6 parts/h for 2.5 hours, and thereafter the supplying rate was lowered to 39.8 parts/h, and it was further supplied thereto for 5 hours.

The monomer mixture including the butylene oxide and the allyl glycidyl ether was supplied thereto at a supplying rate of 6.0 parts/h for 2.0 hours after 30 minutes passed from the beginning of the supply of the above ethylene oxide, and thereafter the supplying rate was lowered to 2.4 parts/h, and it was further supplied thereto for 5 hours.

EXAMPLE 20

A reaction mixture including a polymer having a weight-average molecular weight Mw of 92,000 was obtained in the same way as of Example 18 except that: in Example 18, the ethylene oxide and a monomer mixture including butylene oxide and allyl glycidyl ether as dehydration-treated with molecular sieve (blending ratio (wt/wt): butylene oxide/allyl glycidyl ether=3.9/1.0) were used and each supplied thereto under the following supplying condition (amount of ethylene oxide as supplied: 372.3 parts in total, and amount of monomer mixture as supplied: 49.8 parts in total).
(Supplying Condition)

The ethylene oxide was supplied thereto at a supplying rate of 74.5 parts/h for 2.5 hours, and thereafter the supplying rate was lowered to 37.2 parts/h, and it was further supplied thereto for 5 hours.

The monomer mixture including the butylene oxide and the allyl glycidyl ether was supplied thereto at a supplying rate of 12.4 parts/h for 2.0 hours after 30 minutes passed from the beginning of the supply of the above ethylene oxide, and thereafter the supplying rate was lowered to 5.0 parts/h, and it was further supplied thereto for 5 hours.

EXAMPLE 21

A reaction vessel of 100 L as equipped with MAX BLEND impeller (made by Sumitomo Heavy Industries. Ltd.), a jacket, and an addition inlet was washed with a solvent, and thereafter it was heat-dried and replaced with nitrogen. To this reaction vessel, 422 parts of toluene as dehydration-treated with molecular sieve and 1.7 part of potassium t-butoxide (12.6 wt % tetrahydrofuran (THF) solution) as a reaction initiator were added in order. After the addition, the atmosphere in the reaction vessel was replaced with nitrogen, and was pressurized with the nitrogen until the pressure in the reaction vessel reached 0.3 MPa, and the temperature of the reaction vessel was raised by passing warm water into the jacket while being stirred by rotating the MAX BLEND impeller at 118 rpm (Pv=2.6).

After it was confirmed that the internal temperature reached 90° C., ethylene oxide, and butylene oxide as dehydration-treated with molecular sieve were each supplied thereto under the following supplying condition (amount of ethylene oxide as supplied: 392.4 parts in total, and amount of butylene oxide as supplied: 29.7 parts in total). The reaction was carried out at 100° C.±5° C. while the rise of the internal temperature and the rise of the internal pressure due to heat of polymerization were checked and controlled during the supply.

After the end of the supply, the aging was carried out by further being kept at not lower than 90° C. for 5 hours.

By the above procedure, obtained was a reaction mixture including a polymer having a weight-average molecular weight Mw of 99,000.
(Supplying Condition)

The ethylene oxide and the butylene oxide were supplied thereto at supplying rates of 117.7 parts/h and 8.9 parts/h respectively for 40 minutes, and subsequently supplied at supplying rates of 78.5 parts/h and 5.9 parts/h for 60 minutes, and further supplied at supplying rates of 58.9 parts/h and 4.4 parts/h for 80 minutes, and further supplied at supplying rates of 39.2 parts/h and 3.0 parts/h for 120 minutes, and further supplied at supplying rates of 31.4 parts/h and 2.4 parts/h for 150 minutes.

EXAMPLE 22

A reaction mixture including a polymer having a weight-average molecular weight Mw of 102,000 was obtained in the same way as of Example 21 except that: in Example 21, the ethylene oxide, and the butylene oxide as dehydration-treated with molecular sieve were used and each supplied thereto under the following supplying condition (amount of ethylene oxide as supplied: 372.0 parts in total, and amount of butylene oxide as supplied: 50.1 parts in total).
(Supplying Condition)

First stage: Only the ethylene oxide is supplied thereto at a supplying rate of 74.4 parts/h for 30 minutes.

Second to fourth stages: After 10 minutes have passed after the end of the supply of the former stage, the ethylene oxide is supplied thereto at a supplying rate of 74.4 parts/h for 30 minutes, and the butylene oxide is supplied thereto at a supplying rate of 37.5 parts/h for 10 minutes. In each stage, it is arranged that the supply of the ethylene oxide and the supply of the butylene oxide should be initiated at the same time. Accordingly, it is arranged that: only the supply of the butylene oxide should be first interrupted after 10 minutes have passed from the beginning of the supply, and the ethylene oxide should be further supplied for 20 minutes too long, and thereby the supply of each stage should be completed.

Fifth to ninth stages: After 10 minutes have passed after the end of the supply of the former stage, the ethylene oxide is supplied thereto at a supplying rate of 37.2 parts/h for 60 minutes, and the butylene oxide is supplied thereto at a supplying rate of 18.8 parts/h for 20 minutes. In each stage, it is arranged that the supply of the ethylene oxide and the supply of the monomer mixture should be initiated at the same time. Accordingly, it is arranged that: only the supply of the butylene oxide should be first interrupted after 20 minutes have passed from the beginning of the supply, and the ethylene oxide should be further supplied for 40 minutes too long, and thereby the supply of each stage should be completed.

Tenth stage: After 10 minutes have passed after the end of the supply of the ninth stage, only the ethylene oxide is supplied thereto at a supplying rate of 37.2 parts/h for 60 minutes.

EXAMPLE 23

A reaction mixture including a polymer having a weight-average molecular weight Mw of 110,000 was obtained in the same way as of Example 21 except that: in Example 21, 464 parts of the toluene as dehydration-treated with molecular sieve and 1.3 parts of potassium t-butoxide (12.6 wt % tetrahydrofuran (THF) solution) as a reaction initiator were added to the reaction vessel in order, and further the ethylene oxide, and the butylene oxide as dehydration-treated with molecular sieve were used and each supplied thereto under the following supplying condition (amount of ethylene oxide as supplied: 352.4 parts in total, and amount of butylene oxide as supplied: 26.6 parts in total).
(Supplying Condition)

The ethylene oxide was supplied thereto at a supplying rate of 105.9 parts/h for 40 minutes, and the butylene oxide was supplied thereto at a supplying rate of 16.0 parts/h for 20 minutes after 20 minutes passed after the beginning of the supply of the ethylene oxide, and thereafter the ethylene oxide and the butylene oxide were subsequently supplied thereto at supplying rates of 70.6 parts/h and 10.6 parts/h respectively for 60 minutes, and further supplied at supplying rates of 50.3 parts/h and 8.0 parts/h respectively for 80 minutes. Subsequently, only the ethylene oxide was supplied thereto at a supplying rate of 35.3 parts/h for 120 minutes, and further supplied at a supplying rate of 28.2 parts/h for 150 minutes.

EXAMPLE 24

A reaction mixture including a polymer having a weight-average molecular weight Mw of 126,000 was obtained in the same way as of Example 21 except that: in Example 21, 464 parts of the toluene as dehydration-treated with molecular sieve and 1.3 parts of potassium t-butoxide (12.6 wt % tetrahydrofuran (THF) solution) as a reaction initiator were added to the reaction vessel in order, and further the ethylene oxide, and the butylene oxide as dehydration-treated with molecular sieve were used and each supplied thereto under the following supplying condition (amount of ethylene oxide as supplied: 334.8 parts in total, and amount of butylene oxide as supplied: 45.0 parts in total).
(Supplying Condition)

The ethylene oxide was supplied thereto at a supplying rate of 100.4 parts/h for 40 minutes, and the butylene oxide was supplied thereto at a supplying rate of 27.0 parts/h for 20 minutes after 20 minutes passed after the beginning of the supply of the ethylene oxide, and thereafter the ethylene oxide and the butylene oxide were subsequently supplied thereto at supplying rates of 66.9 parts/h and 18.0 parts/h respectively for 60 minutes, and further supplied at supplying rates of 50.2 parts/h and 13.5 parts/h respectively for 80 minutes. Subsequently, only the ethylene oxide was supplied thereto at a supplying rate of 33.5 parts/h for 120 minutes, and further supplied at a supplying rate of 26.8 parts/h for 150 minutes.

EXAMPLE 25

A reaction mixture including a polymer having a weight-average molecular weight Mw of 140,000 was obtained in the same way as of Example 21 except that: in Example 21, 523 parts of the toluene as dehydration-treated with molecular sieve and 0.9 part of potassium t-butoxide (12.6 wt % tetrahydrofuran (THF) solution) as a reaction initiator were added to the reaction vessel in order, and further the ethylene oxide, and the butylene oxide as dehydration-treated with molecular sieve were used and each supplied thereto under the following supplying condition (amount of ethylene oxide as supplied: 297.9 parts in total, and amount of butylene oxide as supplied: 22.3 parts in total), and the reaction was carried out at 95° C.±5° C. while the rise of the internal temperature and the rise of the internal pressure due to heat of polymerization were checked and controlled during the supply.
(Supplying Condition)

The ethylene oxide was supplied thereto at a supplying rate of 89.4 parts/h for 40 minutes, and the butylene oxide was supplied thereto at a supplying rate of 13.5 parts/h for 20 minutes after 20 minutes passed after the beginning of the supply of the ethylene oxide, and thereafter the ethylene oxide and the butylene oxide were subsequently supplied thereto at supplying rates of 59.6 parts/h and 9.0 parts/h respectively for 60 minutes, and further supplied at supplying rates of 44.7 parts/h and 6.7 parts/h respectively for 80 minutes. Subsequently, only the ethylene oxide was supplied thereto at a supplying rate of 29.8 parts/h for 120 minutes, and further supplied at a supplying rate of 23.8 parts/h for 150 minutes.

EXAMPLE 26

A reaction mixture including a polymer having a weight-average molecular weight Mw of 214,000 was obtained in the same way as of Example 21 except that: in Example 21, 565 parts of the toluene as dehydration-treated with molecular sieve and 0.7 part of potassium t-butoxide (12.6 wt % tetrahydrofuran (THF) solution) as a reaction initiator were added to the reaction vessel in order, and further the ethylene oxide, and the butylene oxide as dehydration-treated with molecular sieve were used and each supplied thereto under the following supplying condition after it was confirmed that the internal temperature reached 80° C. (amount of ethylene oxide as supplied: 245.2 parts in total, and amount of butylene oxide as supplied: 33.0 parts in total), and the reaction was carried out at 90° C.±5° C. while the rise of the internal temperature and the rise of the internal pressure due to heat of polymerization were checked and controlled during the supply.

(Supplying Condition)

The ethylene oxide was supplied thereto at a supplying rate of 73.6 parts/h for 40 minutes, and the butylene oxide was supplied thereto at a supplying rate of 19.8 parts/h for 20 minutes after 20 minutes passed after the beginning of the supply of the ethylene oxide, and thereafter the ethylene oxide and the butylene oxide were subsequently supplied thereto at supplying rates of 49.1 parts/h and 13.2 parts/h respectively for 60 minutes, and further supplied at supplying rates of 36.8 parts/h and 9.9 parts/h respectively for 80 minutes. Subsequently, only the ethylene oxide was supplied thereto at a supplying rate of 24.5 parts/h for 120 minutes, and further supplied at a supplying rate of 19.6 parts/h for 150 minutes.

In this way, as to the reaction mixtures as obtained in Examples 1 to 26 and Comparative Examples 1 to 5, the following evaluation and measurement were carried out. These results are listed in Tables 2 and 3. Incidentally, the weight-average molecular weight (Mw) and the molecular weight distribution (Mw/Mn) of the polymer in each reaction mixture are also listed together in Tables 2 and 3.

[Observation of Appearance]

The reaction mixture as obtained was cooled enough at room temperature, and thereafter the turbidity at room temperature was observed with the eye. These observation results are shown by any of the terms "transparent", "slightly turbid", and "white turbid".

[Clouding Point]

Prepared were three kinds of mixed solvents of toluene/hexane each having a different mixing ratio, and the reaction mixture as obtained was heat-melted in each the mixed solvent so that its concentration would be 1 wt %. Thereafter, measured was the temperature when the cloudiness was caused in a course of cooling slowly.

As to the above three kinds of mixed solvents, the mixing ratios of the toluene/hexane (wt/wt) were 75/25, 78/22, and 80/20.

[Thermal Analysis: Melting Point and Crystallizing Temperature]

The melting point and the crystallizing point of the polymer were measured with the temperature pattern below by using a differential thermal analyzing apparatus. The polymer to be a sample was prepared by treating the reaction mixture as obtained with a reduced-pressure dryer under conditions of 80° C.×2 h, and then removing the volatile content in the reaction mixture.

Temperature pattern: The polymer was once melted by rapidly heating it up to 100° C. in the analyzing apparatus (made by Seiko Instruments & Electronics Ltd., product name: Thermal analyzing apparatus SSC5200H system). Thereafter, the polymer was rapidly cooled up to −150° C. to obtain a crystallized polymer, and then the melting point was measured from melting behavior when the crystallized polymer was heated to 100° C. at 5° C./min. In such measuring conditions, it was known that two melting points could be confirmed, and therefore these results were listed together. Furthermore, the crystallizing temperature was measured from a heat peak accompanying the crystallization as caused when the polymer was cooled from 100° C. to −20° C. at 5° C./min.

[Crystallinity]

The reaction mixture as obtained was dissolved by further adding acetonitrile so that its concentration would be 25 wt %, and the solvent was cast by treating it with a reduced-pressure dryer under conditions of 80° C.×2 h in order to produce a film, and thereafter the film was cooled in a desiccator to room temperature. The crystallinity of this film was measured at room temperature by using an X-ray diffraction (XRD) measuring apparatus (made by Rigaku Denkisha, product name: X-ray diffraction apparatus RINT2400). The crystallinity was calculated from an area ratio of a wide peak derived from noncrystalline phase (Halo) and a sharp peak derived from crystalline phase.

TABLE 2

| | Molecular weight | | Appear- | Clouding point (° C.) | | | Melting point | | Crystallizing temperature | |
|---|---|---|---|---|---|---|---|---|---|---|
| | Mw | Mw/Mn | ance | 75/25 | 78/22 | 80/20 | (° C.) | | (° C.) | Crystallinity |
| Example 1 | 100,000 | 1.61 | Slightly turbid | | | | | | | |
| Example 2 | 90,000 | 1.85 | Slightly turbid | 43.8 | 23.5 | 13.9 | 32.4 | 37.3 | 18.1 | 11.0 |
| Example 3 | 95,000 | 1.67 | Slightly turbid | | | | | | | |
| Example 4 | 84,000 | 1.83 | Slightly turbid | | | | | | | |
| Example 5 | 66,000 | 1.73 | Slightly turbid | | | | | | | |
| Example 6 | 103,000 | 1.90 | Transparent | | | | | | | |
| Example 7 | 91,000 | 1.90 | Transparent | | | | | | | |
| Example 8 | 97,000 | 1.94 | Transparent | | | | 31.1 | 35.5 | 17.8 | |
| Example 9 | 104,000 | 1.73 | White turbid | | | | | | | |
| Example 10 | 26,000 | 2.05 | White turbid | | | | | | | |
| Example 11 | 110,000 | 1.39 | Slightly | | | | 35.5 | 40.5 | 17.0 | |

TABLE 2-continued

| | Molecular weight | | Appearance | Clouding point (° C.) | | | Melting point (° C.) | Crystallizing temperature (° C.) | Crystallinity |
|---|---|---|---|---|---|---|---|---|---|
| | Mw | Mw/Mn | | 75/25 | 78/22 | 80/20 | | | |
| Example 12 | 117,000 | 1.46 | turbid White | 41.5 | 26.2 | 22.6 | | | 15.7 |
| Example 13 | 130,000 | 1.43 | turbid White | | | | | | |
| Example 14 | 80,000 | 1.47 | turbid White | 27.2 | 20.0 | 16.6 | 34.9 | 44.8 | 19.5 |
| Example 15 | 79,000 | 1.58 | turbid White | 31.1 | 18.9 | 16.1 | 33.0 | 43.6 | 18.5 | 14.1 |
| Example 16 | 94,000 | 1.50 | turbid White | | | | 32.3 | 41.1 | 17.0 | 13.0 |
| Example 17 | 110,000 | 1.66 | turbid Transparent | | | | 28.0 | 34.9 | 11.6 | |

TABLE 3

| | Molecular Weight | | Appearance | Clouding point (° C.) | | | Melting point (° C.) | Crystallizing temperature (° C.) | Crystallinity |
|---|---|---|---|---|---|---|---|---|---|
| | Mw | Mw/Mn | | 75/25 | 78/22 | 80/20 | | | |
| Example 18 | 97,000 | 1.87 | | | | | 33.0 | 45.5 | 12.2 | |
| Example 19 | 90,000 | 1.67 | | | | | 34.2 | 43.6 | 13.5 | |
| Example 20 | 92,000 | 1.77 | | | | | 32.3 | 43.0 | 13.5 | |
| Example 21 | 99,000 | 1.57 | | | | | 24.8 | 36.1 | 7.9 | |
| Example 22 | 102,000 | 1.67 | | | | | 29.8 | 44.2 | 12.7 | |
| Example 23 | 110,000 | 1.52 | | | | | 40.5 | 46.7 | 17.9 | |
| Example 24 | 126,000 | 1.43 | | | | | 42.6 | 48.8 | 20.9 | |
| Example 25 | 140,000 | 1.46 | | | | | 37.4 | 43.0 | 16.0 | |
| Example 26 | 214,000 | 1.35 | | | | | | 41.1 | 20.4 | |
| Comparative Example 1 | 77,000 | 2.22 | Slightly turbid | | | | | | | |
| Comparative Example 2 | 57,000 | 1.70 | Slightly turbid | | | | | | | |
| Comparative Example 3 | 34,000 | 1.63 | Slightly turbid | 23.0 | 13.7 | 11.7 | | | | |
| Comparative Example 4 | — | — | — | — | — | — | — | — | — | — |
| Comparative Example 5 | 17,000 | 1.32 | Transparent | | | | | | | |

As to the polymerization condition as set in Examples and Comparative Examples above and the weight-average molecular weight of the polymer as obtained, graphs were prepared from the following viewpoint.

<<Stirring Power During Polymerization and Weight-average Molecular Weight>>

From Examples 1 to 7 and Comparative Example 1, the weight-average molecular weight Mw of the polymer as obtained was plotted against the stirring power Pv during the polymerization. The result is shown in a graph of FIG. 1.

<<Reaction Temperature During Polymerization and Weight-average Molecular Weight>>

Figure 2:
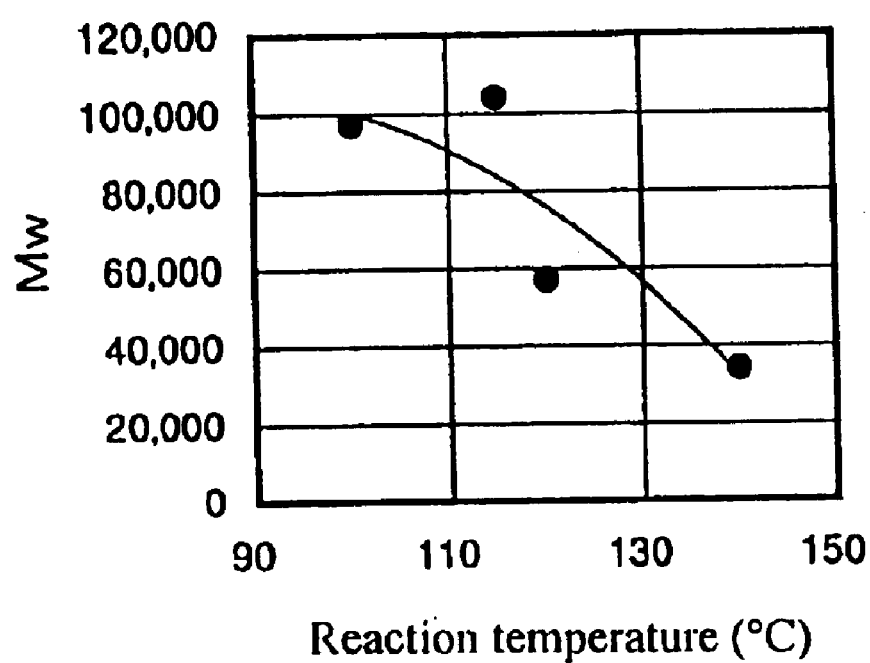
FIG. 2 is a graph concerning the reaction temperature during the polymerization and the weight-average molecular weight Mw of the polymer as obtained.

From Examples 8 and 9 and Comparative Examples 2 and 3, the weight-average molecular weight Mw of the polymer as obtained was plotted against the reaction temperature during the polymerization. The result is shown in a graph of FIG. 2.

EXAMPLE 27

To a concentric coaxial mixing vessel (product name: SUPERBLEND, made by Sumitomo Heavy Industries. Ltd.) equipped with SUPER BLEND impellers (inner impeller: MAX BLEND impeller, and outer impeller: mavable helical baffle), 45 kg of the reaction mixture as obtained in Example 18 was added, and the stirring was carried out by forwardly rotating the MAX BLEND impeller and the mavable helical baffle at 75 rpm and 30 rpm respectively in a state such that the jacket temperature was adjusted to 160° C. Then, the devolatilization of the toluene was carried out for 3.5 hours under atmospheric pressure, and thereafter the devolatilization of the toluene was further carried out for 1.5 hours under reduced pressure of 50 Torr (6,666 Pa) at the maximum, thus concentrating the above reaction mixture.

As to the reaction mixture after the devolatilization, the content of the toluene that was used as the solvent during the polymerization was 0.45 wt %, and the content of the polymer (ethylene oxide copolymer) was 99.55 wt %. In addition, the water content was 103 ppm.

EXAMPLE 28

The reaction mixture as obtained in Example 19 was beforehand heated by steam of 50 to 100° C. as a heat medium, and then charged in a raw-material tank. Thereafter, the reaction mixture was supplied from this raw-material tank to a thin-film evaporator (made by Shinko Pantec Co., Ltd., product named: EXEVA) at a supplying rate of 39 L/h by using a gear pump, and the above reaction mixture was concentrated by the devolatilization. The thin-film evaporator was used while the rotation number of the blade, the rotation number of the discharging screw, the jacket temperature, and the pressure were set to 300 rpm, 95 rpm, 180° C., and 50 Torr (6,666 Pa) respectively. The temperature of the reaction mixture was 175° C. at the outlet of the thin-film evaporator.

As to the reaction mixture after the devolatilization, the content of the toluene that was used as the solvent during the polymerization was 0.39 wt %, and the content of the polymer (ethylene oxide copolymer) was 99.61 wt %. In addition, the water content was 61 ppm.

EXAMPLE 29

The reaction mixture as obtained in Example 23 was beforehand heated by steam of 50 to 100° C. as a heat medium, and then charged in a raw-material tank. Thereafter, the reaction mixture was supplied from this raw-material tank to a thin-film evaporator (made by Shinko Pantec Co., Ltd., product named: EXEVA) at a supplying rate of 35 L/h by using a gear pump, and the above reaction mixture was concentrated by the devolatilization. The thin-film evaporator was used while the rotation number of the blade, the rotation number of the discharging screw, the jacket temperature, and the pressure were set to 300 rpm, 95 rpm, 180° C., and 50 Torr (6,666 Pa) respectively. The temperature of the reaction mixture was 176° C. at the outlet of the thin-film evaporator.

As to the reaction mixture after the devolatilization, the content of the toluene that was used as the solvent during the polymerization was 0.39 wt %, and the content of the polymer (ethylene oxide copolymer) was 99.61 wt %. In addition, the water content was 57 ppm.

EXAMPLE 30

The reaction mixture as obtained in Example 24 was beforehand heated by steam of 50 to 100° C. as a heat medium, and then charged in a raw-material tank. Thereafter, the reaction mixture was supplied from this raw-material tank to a thin-film evaporator (made by Shinko Pantec Co., Ltd., product named: EXEVA) at a supplying rate of 40 L/h by using a gear pump, and the above reaction mixture was concentrated by the devolatilization. The thin-film evaporator was used while the rotation number of the blade, the rotation number of the discharging screw, the jacket temperature, and the pressure were set to 300 rpm, 95 rpm, 180° C., and 50 Torr (6,666 Pa) respectively. The temperature of the reaction mixture was 176° C. at the outlet of the thin-film evaporator.

As to the reaction mixture after the devolatilization, the content of the toluene that was used as the solvent during the polymerization was 0.47 wt %, and the content of the polymer (ethylene oxide copolymer) was 99.53 wt %. In addition, the water content was 71 ppm.

EXAMPLE 31

The reaction mixture as obtained in Example 25 was beforehand heated by steam of 50 to 100° C. as a heat medium, and then charged in a raw-material tank. Thereafter, the reaction mixture was supplied from this raw-material tank to a thin-film evaporator (made by Shinko Pantec Co., Ltd., product named: EXEVA) at a supplying rate of 10 L/h by using a gear pump, and the above reaction mixture was concentrated by the devolatilization. The thin-film evaporator was used while the rotation number of the blade, the rotation number of the discharging screw, the jacket temperature, and the pressure were set to 300 rpm, 40 rpm, 180° C., and 50 Torr (6,666 Pa) respectively. The temperature of the reaction mixture was 180° C. at the outlet of the thin-film evaporator.

As to the reaction mixture after the devolatilization, the content of the toluene that was used as the solvent during the polymerization was 0.30 wt %, and the content of the polymer (ethylene oxide copolymer) was 99.70 wt %. In addition, the water content was 41 ppm.

EXAMPLE 32

The reaction mixture as obtained in Example 26 was beforehand melted, and thereafter charged in a raw-material tank and heated at 80° C. At the same time, as to jackets of a 30φ twin-screw extruder (made by Plastic Technology Laboratory, product name: BT-30-S2), the jackets of a back bent, a supplying bent and the first to fourth bents were all heated to 180° C., and the jacket of the fifth bent was heated to 100° C., and the two screws were rotated at 200 rpm. Thereafter, the above reaction mixture was supplied from the raw-material tank to the above 30φ twin-screw extruder at a supplying rate of 9 kg/h by using a gear pump. At the same time as the supply, the pressures of the back bent, the first bent, and all the second to fourth bents were reduced to 150 Torr (19,998 Pa), 80 Torr (10,666 Pa), and not higher than 80 Torr (10,666 Pa) respectively (the pressures of the supplying bent and the fifth bent were not especially reduced), thus concentrating the above reaction mixture by the devolatilization.

As to the reaction mixture after the devolatilization, the content of the toluene that was used as the solvent during the polymerization was 0.08 wt %, and the content of the polymer (ethylene oxide copolymer) was 99.92 wt %. In addition, the water content was 25 ppm.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for an ethylene oxide copolymer, which comprises the step of carrying out polymerization of a monomer mixture under stirring in a solvent, thereby obtaining the ethylene copolymer, wherein the monomer mixture includes ethylene oxide and a substituted oxirane compound of a structural formula (1) below as essential raw materials, wherein the stirring is carried out by a stirring power of not less than 0.6 kW/m$^3$, and wherein the structural formula (1) is:

where: $R_1$ denotes Ra (Ra is any group having 1 to 16 carbon atoms selected from among alkyl groups, cycloalkyl groups, aryl groups, aralkyl groups, (meth)acryloyl groups, and alkenyl groups) or a —CH$_2$—O—Re—Ra group (Re has a structure of —(CH$_2$—CH$_2$—O)$_p$— (p denotes an integer of 0 to 10))).

2. A production process according to claim 1, wherein the polymerization is carried out at a reaction temperature of lower than 120° C.

3. A production process according to claim 1, wherein it is arranged that:

the polymerization of the monomer mixture should be carried out using a reaction initiator; and the solvent should have a water content of not more than 1 in mol ratio relative to the amount of the reaction initiator when the polymerization is initiated.

4. A production process according to claim 1, wherein the polymerization is carried out at a reaction temperature of lower than 120° C., and wherein it is arranged that:

the polymerization of the monomer mixture should be carried out using a reaction initiator; and the solvent should have water content of not more than 1 in mol ratio relative to the amount of the reaction initiator when the polymerization is initiated.

5. A production process according to claim 1, wherein the substituted oxirane compound includes, as an essential component, a substituted oxirane compound having a crosslinkable substituent.

6. A production process according to claim 1, wherein it is arranged that:

the polymerization should be carried out while at least a portion of the monomer mixture is supplied into the solvent; and as to at least one of the essential raw materials, its supplying rate should be varied.

7. A production process according to claim 1, wherein it is arranged that:

the polymerization should be carried out while at least a portion of the monomer mixture is supplied into the solvent; and there should exist a period in which at least one of the essential raw materials is not supplied.

8. A production process according to claim 1, wherein the substituted oxirane compound includes, as an essential component, a substituted oxirane compound having a crosslinkable substituent, and wherein the polymerization is carried out at a reaction temperature of lower than 120° C., and wherein it is arranged that:

the polymerization of the monomer mixture should be carried out using a reaction initiator; and the solvent should have a water content of not more than 1 in mol ratio relative to the amount of the reaction initiator when the polymerization is initiated.

9. A production process according to claim 1, wherein the polymerization is carried out at a reaction temperature of lower than 120° C., and wherein it is arranged that:

the polymerization of the monomer mixture should be carried out using a reaction initiator; and the solvent should have a water content of not more than 1 in mol ratio relative to the amount of the reaction initiator when the polymerization is initiated, and wherein it is arranged that:

the polymerization should be carried out while at least a portion of the monomer mixture is supplied into the solvent; and as to at least one of the essential raw materials, its supplying rate should be varied.

10. A production process according to claim 1, wherein the polymerization is carried out at a reaction temperature of lower than 120° C., and wherein it is arranged that:

the polymerization of the monomer mixture should be carried out using a reaction initiator; and the solvent should have a content of not more than 1 in mol ratio relative to the amount of the reaction initiator when the polymerization is initiated, and wherein it is arranged that:

the polymerization should be carried out while at least a portion of the monomer mixture is supplied into the solvent; and there should exist a period in which at least one of the essential raw materials is not supplied.

11. A production process according to claim 1, wherein the polymerization is carried out at a reaction temperature of lower than 120° C., and wherein it is arranged that:

the polymerization of the monomer mixture should be carried out using a reaction initiator; and the solvent should have a water content of not more than 1 in mol ratio relative to the amount of the reaction initiator when the polymerization is initiated, and wherein it is arranged that:

the polymerization should be carried out while at least a portion of the monomer mixture is supplied into the solvent: as to at least one of the essential raw materials, its supplying rate should be varied; and there should exist a period in which at least one of the essential raw materials is not supplied.

12. A production process according to claim 1, wherein the substituted oxirane compound includes, as an essential component, a substituted oxirane compound having a crosslinkable substituent, and wherein the polymerization is carried out at a reaction temperature of lower than 120° C., and wherein it is arranged that:

the polymerization of the monomer mixture should be carried out using a reaction initiator; and the solvent should have a water content of not more than 1 in mol ratio relative to the amount of the reaction initiator when the polymerization is initiated, and wherein it is arranged that:

the polymerization should be carried out while at least a portion of the monomer mixture is supplied into the solvent; as to at least one of the essential raw materials, its supplying rate should be varied; and there should exist a period in which at least one of the essential raw materials is not supplied.

13. A production process according to claim 1, wherein it is arranged that: the polymerization of the monomer mixture should be carried out using a reaction initiator; and the solvent should have a water content of not more than 0.5 in mol ratio relative to the amount of the reaction initiator when the polymerization is initiated.

14. A production process according to claim 1, wherein the obtained ethylene oxide copolymer has a weight-average molecular weight in the range of about 26,000 to about 214,000.

15. A production process for an ethylene oxide copolymer, which comprises the step of carrying out polymerization of a monomer mixture under stirring in a solvent, thereby obtaining the ethylene copolymner, wherein the monomer mixture includes ethylene oxide and a substituted oxirane compound of a structural formula (1) below as essential raw materials, wherein the stirring is carried out by a stirring power of not less than $0.6 \text{ kW/m}^3$, and wherein the structural formula (1) is:

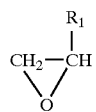
(1)

where: $R_1$ denotes Ra (Ra is any group having 1 to 16 carbon atoms selected from among alkyl groups, cycloalkyl groups, aryl groups, aralkyl groups, (meth)acryloyl groups, and alkenyl groups) or a —$CH_2$—O—Re—Ra group (Re has a structure of —($CH_2$—$CH_2$—O)$_p$— (p denotes an integer of 0 to 10)));

wherein the polymerization is carried out at a reaction temperature of lower than 120° C.;

wherein it is arranged that: the polymerization of the monomer mixture should be carried out using a reaction initiator: and the solvent should have a water content of not more than 0.5 in mol ratio relative to the amount of the reaction initiator when the polymerization is initiated; and wherein the obtained ethylene oxide copolymer has a weight-average molecular weight in the range of 26,000 to 214,000.

* * * * *